(12) United States Patent
Wang

(10) Patent No.: US 12,543,159 B2
(45) Date of Patent: Feb. 3, 2026

(54) RESOURCE CONFIGURATION METHOD AND APPARATUS

(71) Applicant: HUAWEI TECHNOLOGIES CO., LTD., GuangDong (CN)

(72) Inventor: Hongwei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/147,127

(22) Filed: Dec. 28, 2022

(65) Prior Publication Data

US 2023/0139778 A1 May 4, 2023

Related U.S. Application Data

(63) Continuation of application No. PCT/CN2021/102558, filed on Jun. 25, 2021.

(30) Foreign Application Priority Data

Jul. 1, 2020 (CN) .......................... 202010622058.5

(51) Int. Cl.
- *H04W 72/0453* (2023.01)
- *H04L 1/00* (2006.01)
- *H04W 72/54* (2023.01)

(52) U.S. Cl.
CPC ....... *H04W 72/0453* (2013.01); *H04L 1/0067* (2013.01); *H04W 72/54* (2023.01)

(58) Field of Classification Search
None
See application file for complete search history.

(56) References Cited

U.S. PATENT DOCUMENTS

| | | |
|---|---|---|
| 2018/0070369 A1 | 3/2018 | Papasakellariou |
| 2018/0192404 A1* | 7/2018 | Maaref ................. H04L 5/0044 |

(Continued)

FOREIGN PATENT DOCUMENTS

| | | |
|---|---|---|
| CN | 104618914 A | 5/2015 |
| CN | 107509205 A | 12/2017 |

(Continued)

OTHER PUBLICATIONS

Ericsson: "Enhancements for dynamic spectrum sharing in Rel-16," 3GPP TSG-RAN Meeting #84, Newport Beach, CA, USA, Jun. 3-6, 2019; RP-191042; 8 total pages.

(Continued)

*Primary Examiner* — Srinivasa R Reddivalam
(74) *Attorney, Agent, or Firm* — Rimon PC

(57) ABSTRACT

Embodiments of this application provide a resource configuration method and apparatus, and relate to the field of communication technologies, to resolve a problem that demodulation performance of a terminal device in a long term evolution (LTE) cell deteriorates when resources for the LTE cell avoid resources for a new radio (NR) cell. A solution for resolving this problem may include obtaining, by an access network device, first configuration information. The first configuration information includes a bandwidth range of a NR cell, and the bandwidth range of the NR cell includes a dedicated frequency domain resource of the NR cell and a frequency domain resource shared by the NR cell and a LTE cell. The solution further includes sending, by the access network device, the first configuration information to a terminal device in the NR cell.

20 Claims, 14 Drawing Sheets

(56) References Cited

U.S. PATENT DOCUMENTS

| | | | | |
|---|---|---|---|---|
| 2020/0084805 A1* | 3/2020 | Li | ................... | H04W 72/0453 |
| 2020/0366440 A1* | 11/2020 | Tsai | ................... | H04L 5/0051 |
| 2021/0377830 A1* | 12/2021 | Jin | ................... | H04W 36/0058 |
| 2022/0182842 A1* | 6/2022 | Baldemair | ............ | H04W 16/14 |

FOREIGN PATENT DOCUMENTS

| | | | |
|---|---|---|---|
| CN | 108366375 | A | 8/2018 |
| CN | 109041067 | A | 12/2018 |
| CN | 109818693 | A | 5/2019 |
| CN | 109982328 | A | 7/2019 |
| CN | 110199497 | A | 9/2019 |
| CN | 110278563 | A | 9/2019 |
| CN | 110300155 | A | 10/2019 |
| CN | 110312261 | A | 10/2019 |
| CN | 110839248 | A | 2/2020 |
| CN | 111148191 | A | 5/2020 |
| JP | 2020504925 | A | 2/2020 |
| JP | 2020053849 | A | 4/2020 |
| WO | 2017173133 | A1 | 10/2017 |
| WO | 2018127074 | A1 | 7/2018 |
| WO | 2019183941 | A1 | 10/2019 |
| WO | 2020125479 | A1 | 6/2020 |
| WO | 2020190195 | A1 | 9/2020 |
| WO | 2021022391 | A1 | 2/2021 |

OTHER PUBLICATIONS

Sergey Maximov et al., 5G NR and 4G LTE Coexistence, A Comprehensive Deployment Guide to Dynamic Spectrum Sharing, Mediatek, Mar. 3, 2020 (Mar. 3, 2020), pp. 1-30; 30 total pages.

* cited by examiner

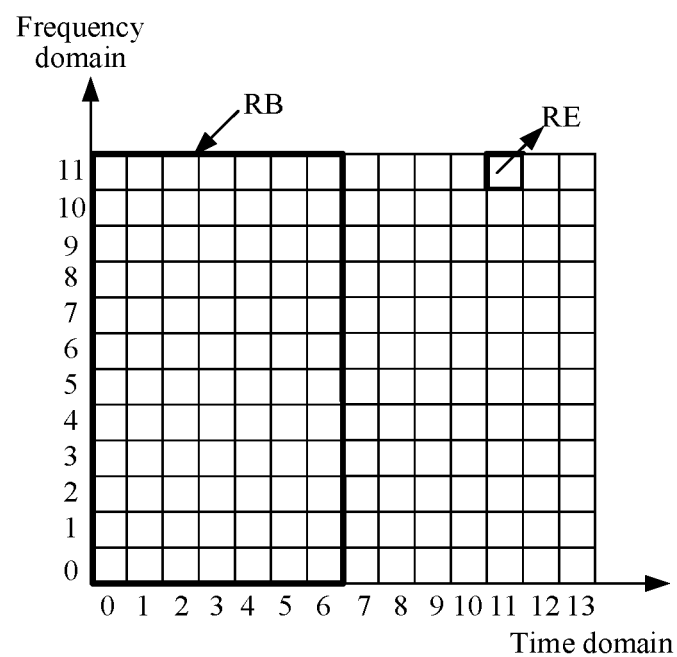
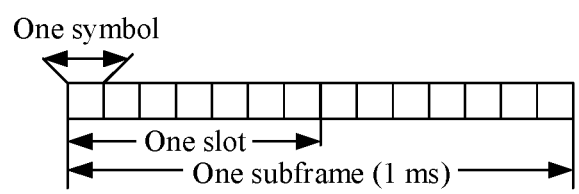
FIG. 1

FIG. 2(c)-1

One RB of an NR cell (a)

One RB of an LTE cell (b)

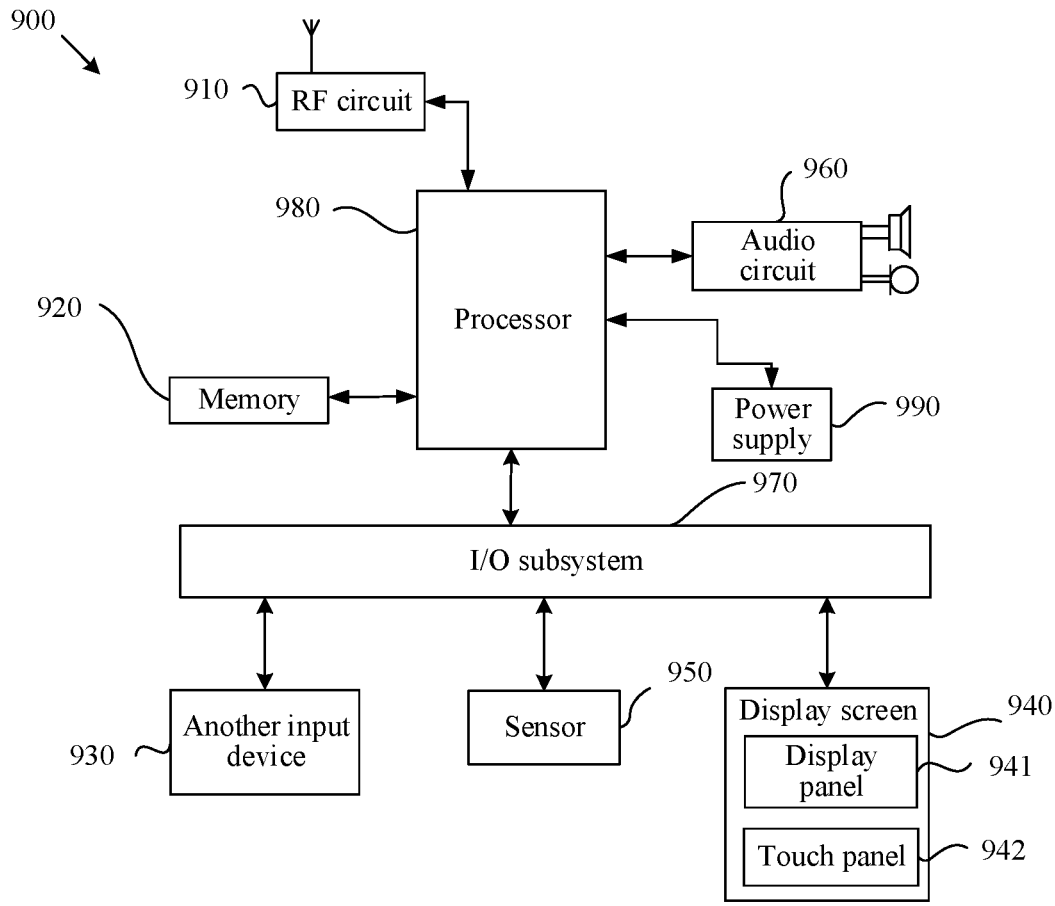

FIG. 9

An access network device obtains first configuration information, where the first configuration information includes a bandwidth range of an NR cell, and the bandwidth range of the NR cell includes a dedicated frequency domain resource of the NR cell and a frequency domain resource shared by the NR cell and an LTE cell — 101

The access network device sends the first configuration information to a terminal device in the NR cell — 102

FIG. 10

RESOURCE CONFIGURATION METHOD AND APPARATUS

CROSS-REFERENCE TO RELATED APPLICATIONS

This application is a continuation of International Application No. PCT/CN2021/102558, filed on Jun. 25, 2021, which claims priority to Chinese Patent Application No. 202010622058.5, filed on Jul. 1, 2020. The disclosures of the aforementioned applications are hereby incorporated by reference in their entireties.

TECHNICAL FIELD

Embodiments of this application generally relate to the field of communication technologies, and in particular, to a resource configuration method and an apparatus.

BACKGROUND

To implement a smooth evolution from a 4$^{th}$ generation mobile communication technology (4G) to a 5$^{th}$ generation mobile communication technology (5G), a 4G and 5G spectrum sharing technology has been launched in the industry. This technology enables a same spectrum to serve both a long term evolution (LTE) air interface technology of 4G and a new radio (NR) technology of 5G. In this way, when a quantity of 5G users is relatively small, spectrum resources can be used for as many 4G users as possible. When the quantity of 5G users increases, more spectrum resources can be used to serve 5G users. In this way, spectrum resource utilization is improved along with the user penetration rate.

Currently, commercial mobile networks mainly use the LTE technology. Therefore, a main frequency division duplex (FDD) spectra of operators have been occupied by LTE. LTE and NR spectrum sharing based on this technology is usually implemented on a same carrier bandwidth of LTE and NR, that is, spectrum sharing is implemented by using LTE and NR. However, a difference between the LTE air interface technology and the NR new radio technology lies in the following: In LTE, a cell reference signal (CRS) is used by a terminal device to measure coverage strength of a cell, and is used by the terminal device to perform channel estimation, so as to demodulate received data. In NR, the two functions are separated, to be specific, a terminal device directly measures a synchronization signal and physical broadcast channel block (SSB) to measure coverage strength of a cell, and then a separate user-level demodulation reference signal (DMRS) is introduced to perform channel estimation during demodulation of received data.

In a scenario of spectrum sharing, this difference between LTE and NR causes a resource conflict. For example, an NR cell needs to avoid resources for a CRS of an LTE cell, which reduces resource utilization of the NR. cell. In addition, the LTE cell also needs to avoid resources for an SSB of the NR cell; otherwise, the terminal device in the NR cell cannot measure the NR cell. However, the terminal device in the LTE cell is usually a legacy terminal. Once the CRS of the LTE cell avoids resources for an SSB and cannot be normally received by the terminal device, channel estimation of the terminal device in the LTE cell is distorted, affecting performance of the terminal in the LTE cell. Therefore, currently, in a scenario of spectrum sharing between the LTE. cell and the NR cell, a performance loss caused by mutual avoidance of channels is an urgent problem to be resolved.

SUMMARY

Embodiments of this application provide a resource configuration method and apparatus, to resolve a problem that demodulation performance of a terminal device in a long term evolution (LTE) cell deteriorates when resources for the LTE cell avoid resources for a new radio (NR) cell.

To achieve the foregoing objectives, the following technical solutions are used in the embodiments of this application.

According to a first aspect, a resource configuration method is provided, including: obtaining, by an access network device, first configuration information, where the first configuration information includes a bandwidth range of a NR cell, and the bandwidth range of the NR cell includes a dedicated frequency domain resource of the NR cell and a frequency domain resource shared by the NR. cell and a LTE cell; and sending, by the access network device, the first configuration information to a terminal device in the NR cell. The access network device may be a baseband unit (BBU).

Therefore, in this application, the dedicated frequency domain resource of the NR cell is configured, so that a signal allocating a resource in the dedicated frequency domain resource of the NR cell is not interfered with by the LTE cell during sending, and correspondingly, the signal allocating a resource in the dedicated frequency domain resource of the NR cell does not interfere with sending of a signal in the LTE cell during sending. Therefore, in this application, the dedicated frequency domain resource is configured for the NR cell, to avoid a problem that demodulation performance of the terminal device in the LTE cell deteriorates when resources for the LTE cell avoid resources for the NR. cell. In addition, when receiving a signal on the dedicated frequency domain resource, the terminal device in the NR cell does not need to receive a rate matching template sent by an access device, to avoid sending of a signal in the LTE cell.

In a possible design, the method further includes: obtaining, by the access network device, second configuration information, where the second configuration information includes a bandwidth range of the LTE cell, and the bandwidth range of the LTE cell includes the frequency domain resource shared by the LTE cell and the NR cell; and sending, by the access network device, the second configuration information to a terminal device in the LTE cell.

It may also be understood that there is a spectrum sharing bandwidth in the bandwidth ranges of the LTE cell and the NR cell. However, because the NR cell further has the dedicated frequency domain resource, it may be understood that the bandwidth range of the NR cell is greater than the bandwidth range of the LTE cell, and an extra bandwidth in the bandwidth range of the NR cell compared with the bandwidth range of the LTE cell is the dedicated frequency domain resource of the NR cell. Certainly, the LTE cell may also have a dedicated frequency domain resource. Therefore, the dedicated frequency domain resource of the NR cell does not need to avoid the resources for the LTE cell, so that the demodulation performance of the terminal device in the LTE cell can be improved.

In a possible design, the first configuration information is canned in a first system message, and the second configuration information is carried in a second system message. That is, the first configuration information may be periodically broadcast by the access network device to a terminal device within a range of the NR cell by using the first system message, so that the terminal device entering the range of the NR cell learns, in a timely manner, the bandwidth range configured by the access network device. Similarly, the second configuration information is also periodically broadcast by the access network device to a terminal device within a range of the LTE cell by using the second system message, so that the terminal device entering the range of the LTE cell learns, in a timely manner, the bandwidth range configured by the access network device.

In a possible design, the method further includes: allocating, by the access network device, a frequency domain resource to a first signal in the NR cell, where the frequency domain resource of the first signal is on the dedicated frequency domain resource; and the first signal includes at least one of the following signals: a signal used by the terminal device to synchronize with the access network device, a signal used by the terminal device to perform a timing function with the access network device, a signal used by the terminal device to obtain cell channel state information, a signal used by the terminal device to determine a cell to be camped on, and a signal used by the terminal device to access the access network device.

It may be understood that, the access network device may allocate, on the dedicated frequency domain resource of the NR cell, frequency domain resources to some relatively important signals that are prone to interference and affect access of the terminal device, and record these signals as the first signal. In other words, when the BBU needs to allocate a frequency domain resource to the first signal, the BBU may allocate the resource on the dedicated frequency domain resource of the NR cell.

In a possible design, the signal used by the terminal device to synchronize with the access network device includes a synchronization signal and physical broadcast channel block (SSB); the signal used by the terminal device to perform a timing function with the access network device includes a tracking reference signal (TRS); the signal used by the terminal device to evaluate the cell channel state information includes a channel state information-reference signal (CSI-RS) and a demodulation reference signal (DMRS); the signal used by the terminal device to determine a cell to be camped on includes: a common physical downlink control channel (Common PDCCH); and the signal used by the terminal device to access the access network device includes a physical random access channel (PRACH).

For example, in the current technology, resources for a CRS of the LTE cell need to avoid resources for an SSB of the NR cell, which leads to distortion of channel estimation by the terminal device in the LTE cell. In this application, when the BBU allocates a frequency domain resource of the SSB of the NR cell on the dedicated frequency domain resource of the NR cell, the SSB can be prevented from being interfered with by the CRS sent by the LTE cell, and interference caused by the SSB sent by the NR cell to a legacy terminal device in the LTE cell can also be avoided, so that the demodulation performance of the terminal device in the LTE cell can be improved.

In a possible design, the method further includes: allocating, by the access network device, a frequency domain resource of a physical downlink control channel (PDCCH) to the NR cell, where the frequency domain resource of the PDCCH is on the dedicated frequency domain resource, or the frequency domain resource of the PDCCH is on the shared frequency domain resource, or a first part of the frequency domain resource of the PDCCH is on the dedicated frequency domain resource and a second part is on the shared frequency domain resource.

When allocating the frequency domain resource of the PDCCH to the terminal device, the access network device may determine a location of the frequency domain resource based on a user level, a service type, and the like of the terminal device. For example, for a terminal device with a relatively high user level, an allocated frequency domain resource of the PDCCH may be on the dedicated frequency domain resource of the NR cell, and for a terminal device with a relatively low user level, an allocated frequency domain resource of the PDCCH may be on the shared frequency domain resource, or a first part of the allocated frequency domain signal is on the dedicated frequency domain resource and a second part is on the shared frequency domain resource, to improve performance of a terminal device with a high user level. Alternatively, for a terminal device with a relatively high service type priority, an allocated frequency domain resource of the PDCCH may be on the dedicated frequency domain resource of the NR cell, to improve performance of a terminal device with a higher service type priority. For a terminal device with a relatively low service type priority, an allocated frequency domain resource of the PDCCH may be on the shared frequency domain resource, or a first part of the allocated frequency domain resource may be on the dedicated frequency domain resource and a second part may be on the shared frequency domain resource.

In a possible design, the method further includes: when the access network device allocates a frequency domain resource to a second signal in the NR cell, preferentially allocating, by the access network device, the dedicated frequency domain resource to the second signal. In this way, when there is an available remaining resource in the dedicated frequency domain resource and the remaining resource can be allocated to the second signal, it can be ensured that the second signal is not interfered with by a signal sent by the LTE cell.

In a possible design, the second signal includes any one of the following signals: a PDCCH, a physical downlink shared channel (PDSCH), a physical uplink control channel (PUCCH), and a physical uplink shared channel (PUSCH). All these signals may be understood as important signals that affect performance of the terminal device. Therefore, during resource allocation, the dedicated frequency domain resource may be preferentially allocated.

In a possible design, the method further includes: when the access network device determines that the shared frequency domain resource is to be allocated to a PDCCH or a PDSCH of the NR cell, sending, by the access network device, a rate matching template to the terminal device in the NR cell, where the rate matching template indicates the terminal device not to receive, when receiving the PDCCH or the PDSCH, data on a resource indicated by the rate matching template.

In other words, if the frequency domain resource allocated by the access network device to the PDCCH or the PDSCH of the NR cell includes the frequency domain resource shared by the NR cell and the LTE cell, to avoid a resource conflict with the CRS of the LTE cell, the access network device may need to puncture some time-frequency resources of the PDCCH or the PDSCH and deliver the rate matching template. Correspondingly, the terminal device may identify punctured resource elements (REs) based on the rate matching template, to skip receiving data on these punctured REs.

In a possible design, the method may further include: allocating, by the access network device, the first three symbols in one slot to the PDCCH of the NR cell on the dedicated frequency domain resource of the NR cell.

Therefore, in the dedicated frequency domain resource that is of the NR cell and that is configured by the access network device, the PDCCH of the NR cell may occupy the zeroth symbol, the first symbol, and the second symbol. In this way, a PDCCH resource capacity of the NR cell can be increased, the performance deterioration of the NR cell caused by insufficient control channels can be avoided, and the quantity of user equipment (UEs) that can be admitted by the NR cell can be increased.

In a possible design, the method may further include: sending, by the access network device, the first configuration information and the second configuration information to a remote radio unit/active antenna unit (RRU/AAU).

Because the BBU needs to send a signal to the terminal device by using the RRU/AAU, the RRU/AAU needs to support a resource configuration of the BBU. Therefore, when configuring a new bandwidth range, the BBU needs to notify the RRU/AAU in time.

In a possible design, the method may further include: sending, by the access network device, third configuration information to the RRU/AAU, where the third configuration information includes first indication information and second indication information, the first indication information indicates a frequency domain resource location of the NR cell, and the second indication information indicates a frequency domain resource location of the LTE cell. Correspondingly, the RRU/AAU may receive the third configuration information sent by the BBU. For example, when the BBU sends a resource configuration message of a signal to the terminal device by using the RRU/AAU, the RRU/AAU may support the configuration of the BBU, and the RRU/AAU sends the resource configuration message to the terminal device based on the configuration of the BBU.

The frequency domain resource location of the NR cell includes a dedicated frequency domain resource location. The dedicated frequency domain resource location includes a frequency domain resource location of an SSB of the NR cell, a frequency domain resource location of a PRACH of the NR cell, a partial resource location of a frequency domain resource of a PDCCH of the NR cell, and the like. In this way, when sending a signal to the terminal device, the RRU/AAU can support the principle of resource allocation by the BBU.

According to a second aspect, a resource configuration method is provided. The method includes: receiving, by a terminal device, first configuration information sent by an access network device, where the first configuration information includes a bandwidth range of a NR cell, and the bandwidth range of the NR cell includes a dedicated frequency domain resource of the NR cell and a frequency domain resource shared by the NR cell and an LTE cell; and obtaining, by the terminal device based on the first configuration information, a frequency domain resource of a signal sent by the NR cell. For beneficial effects of the second aspect, refer to descriptions of beneficial effects of the first aspect.

In a possible design, the method includes: receiving, by the terminal device, second configuration information sent by the access network device, where the second configuration information includes a bandwidth range of the LTE cell, and the bandwidth range of the LTE cell includes the frequency domain resource shared by the LTE cell and the NR cell; and obtaining, by the terminal device based on the second configuration information, a frequency domain resource of a signal sent by the LTE cell.

In a possible design, the first configuration information is carried in a first system message, and the second configuration information is carried in a second system message.

In a possible design, the method further includes: determining, by the terminal device, a frequency domain resource of a first signal sent by the NR cell, where the frequency domain resource of the first signal is on the dedicated frequency domain resource; and the first signal includes at least one of the following signals: a signal used by the terminal device to synchronize with the access network device, a signal used by the terminal device to perform a timing function with the access network device, a signal used by the terminal device to obtain cell channel state information, a signal used by the terminal device to determine a cell to be camped on, and a signal used by the terminal device to access the access network device.

In a possible design, the signal used by the terminal device to synchronize with the access network device includes a SSB; the signal used by the terminal device to perform a timing function with the access network device includes a TRS: the signal used by the terminal device to evaluate the cell channel state information includes a CSI-RS and a DMRS; the signal used by the terminal device to determine a cell to be camped on includes: a common PDCCH; and the signal used by the terminal device to access the access network device includes a PRACH.

In a possible design, the method further includes: determining, by the terminal device, to allocate a frequency domain resource of a PDCCH to the NR cell, where the frequency domain resource of the PDCCH is on the dedicated frequency domain resource, or the frequency domain resource of the PDCCH is on the shared frequency domain resource, or a first part of the frequency domain resource of the PDCCH is on the dedicated frequency domain resource and a second part is on the shared frequency domain resource.

In a possible design, the method further includes: receiving, by the terminal device, a rate matching template sent by the access network device, where the rate matching template indicates the terminal device not to receive, when receiving a PDCCH or a PDSCH, data on a resource indicated by the rate matching template.

According to a third aspect, a communication apparatus is provided, including: a processing unit (e.g., processing circuit), configured to obtain first configuration information, where the first configuration information includes a bandwidth range of a NR cell, and the bandwidth range of the NR cell includes a dedicated frequency domain resource of the NR cell and a frequency domain resource shared by the NR cell and a LTE cell; and a transceiver unit (e.g., transceiver circuit), configured to send the first configuration information to a terminal device in the NR cell. The communication apparatus is the access network device involved in the first aspect or a chip.

In a possible design, the processing unit is further configured to obtain second configuration information, where the second configuration information includes a bandwidth range of the LTE cell, and the bandwidth range of the LTE cell includes the frequency domain resource shared by the LTE cell and the NR cell; and the transceiver unit is further configured to send the second configuration information to a terminal device in the LTE cell.

In a possible design, the first configuration information is carried in a first system message, and the second configuration information is carried in a second system message.

In a possible design, the processing unit is further configured to allocate a frequency domain resource to a first signal in the NR cell, where the frequency domain resource of the first signal is on the dedicated frequency domain resource; and the first signal includes at least one of the following signals: a signal used by the terminal device to synchronize with the access network device, a signal used by the terminal device to perform a timing function with the access network device, a signal used by the terminal device to obtain cell channel state information, a signal used by the terminal device to determine a cell to be camped on, and a signal used by the terminal device to access the access network device.

In a possible design, the signal used by the terminal device to synchronize with the access network device includes a SSB; the signal used by the terminal device to perform a timing function with the access network device includes a TRS; the signal used by the terminal device to evaluate the cell channel state information includes a CSI-RS and a DMRS; the signal used by the terminal device to determine a cell to be camped on includes: a common PDCCH; and the signal used by the terminal device to access the access network device includes a PRACH.

In a possible design, the processing unit is further configured to allocate a frequency domain resource of a PDCCH to the NR cell, where the frequency domain resource of the PDCCH is on the dedicated frequency domain resource, or the frequency domain resource of the PDCCH is on the shared frequency domain resource, or a first part of the frequency domain resource of the PDCCH is on the dedicated frequency domain resource and a second part is on the shared frequency domain resource.

In a possible design, the processing unit is further configured to: when allocating a frequency domain resource to a second signal in the NR cell, preferentially allocate the dedicated frequency domain resource to the second signal.

In a possible design, the second signal includes any one of the following signals: a PDCCH, a PDSCH, a PUCCH, and a PUSCH.

In a possible design, the transceiver unit is further configured to: when it is determined that the shared frequency domain resource is to be allocated to a PDCCH or a PDSCH of the NR cell, send a rate matching template to the terminal device in the NR cell, where the rate matching template indicates the terminal device not to receive, when receiving the PDCCH or the PDSCH, data on a resource indicated by the rate matching template.

According to a fourth aspect, a terminal device is provided, including a transceiver unit, configured to receive first configuration information sent by an access network device, where the first configuration information includes a bandwidth range of a NR cell, and the bandwidth range of the NR cell includes a dedicated frequency domain resource of the NR cell and a frequency domain resource shared by the NR cell and an LTE cell; and a processing unit, configured to obtain, based on the first configuration information, a frequency domain resource of a signal sent by the NR cell.

In a possible design, the transceiver unit is further configured to receive second configuration information sent by the access network device, where the second configuration information includes a bandwidth range of the LTE cell, and the bandwidth range of the LTE cell includes the frequency domain resource shared by the LTE cell and the NR cell; and the processing unit is configured to obtain, based on the second configuration information, a frequency domain resource of a signal sent by the LTE cell.

In a possible design, the first configuration information is carried in a first system message, and the second configuration information is carried in a second system message.

In a possible design, the processing unit is further configured to determine a frequency domain resource of a first signal sent by the NR cell, where the frequency domain resource of the first signal is on the dedicated frequency domain resource; and the first signal includes at least one of the following signals: a signal used by the terminal device to synchronize with the access network device, a signal used by the terminal device to perform a timing function with the access network device, a signal used by the terminal device to obtain cell channel state information, a signal used by the terminal device to determine a cell to be camped on, and a signal used by the terminal device to access the access network device.

In a possible design, the signal used by the terminal device to synchronize with the access network device includes an SSB; the signal used by the terminal device to perform a timing function with the access network device includes: a TRS; the signal used by the terminal device to evaluate the cell channel state information includes a CSI-RS and a DMRS; the signal used by the terminal device to determine a cell to be camped on includes a common PDCCH; and the signal used by the terminal device to access the access network device includes a PRACH.

In a possible design, the processing unit is further configured to determine to allocate, a frequency domain resource of a PDCCH to the NR cell, where the frequency domain resource of the PDCCH is on the dedicated frequency domain resource, or the frequency domain resource of the PDCCH is on the shared frequency domain resource, or a first part of the frequency domain resource of the PDCCH is on the dedicated frequency domain resource and a second part is on the shared frequency domain resource.

In a possible design, the transceiver unit is further configured to receive a rate matching template sent by the access network device, where the rate matching template indicates the terminal device not to receive, when receiving a PDCCH or a PDSCH, data on a resource indicated by the rate matching template.

According to a fifth aspect, a computer-readable storage medium is provided, including computer instructions, where when the computer instructions are nm on an electronic device, the electronic device is enabled to perform the method in the first aspect or any one of the possible designs of the first aspect, or the electronic device is enabled to perform the method in the second aspect or any one of the possible designs of the second aspect.

According to a sixth aspect, a computer program product is provided, where when the computer program product is run on a computer, an electronic device is enabled to perform the method in the first aspect or any one of the possible designs of the first aspect, or the electronic device is enabled to perform the method in the second aspect or any one of the possible designs of the second aspect.

BRIEF DESCRIPTION OF DRAWINGS

FIG. 1 is a schematic diagram of resource distribution in a frequency domain and in a time domain in long term evolution (LTE) according to an embodiment of this application;

FIG. 9 is a schematic structural diagram of a terminal device according to an embodiment of this application;

FIG. 10 is a schematic flowchart of a resource configuration method according to an embodiment of this application;

DESCRIPTION OF EMBODIMENTS

Figure 2A:
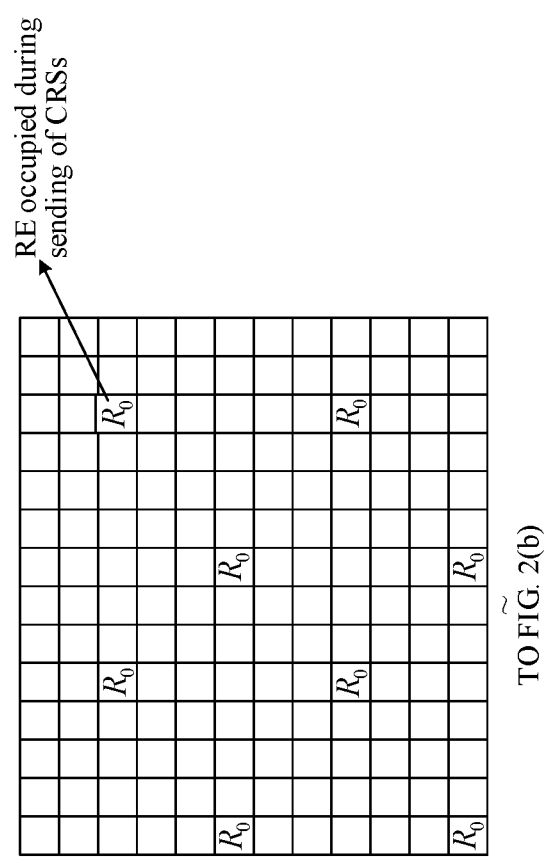
FIG. 2(a) to FIG. 2(c)-2 are a schematic diagram of resource occupation when a base station sends cell reference signal (CRSs) on different quantities of antenna ports in LTE according to an embodiment of this application.

The following describes technical solutions in embodiments of this application with reference to the accompanying drawings in the embodiments of this application. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The terms "first" and "second" mentioned below are merely intended for a purpose of description, and shall not be understood as an indication or implication of relative importance or implicit indication of the quantity of indicated technical features. Therefore, a feature limited by "first " or "second" may explicitly indicate or implicitly include one or more such features. In the descriptions of the embodiments, unless otherwise stated, "a plurality of" means two or more than two.

For ease of understanding, the following uses examples to describe some concepts related to the embodiments of this application for reference. Details are as follows:

A single LTE carrier bandwidth includes 1.4 MHz, 3 MHz, 5 MHz, 10 MHz, 15 MHz, 20 MHz, and the like.

Small bandwidths are discarded and large bandwidths are expanded for a single NR carrier bandwidth based on different frequency bands. A single carrier bandwidth includes 5 MHz, 10 MHz, 15 MHz, 20 MHz, 25 MHz, 30 MHz, 40 MHz, 50 MHz, 60 MHz, 80 MHz, 90 MHz, 100 MHz, and the like.

Conventionally, a commercial mobile network mainly uses long term evolution (LTE). Therefore, main frequency division duplex (FDD) spectra of operators have been occupied by LTE. Symmetric spectrum sharing between LTE and new radio (NR) performed based on this technology is usually implemented on a same carrier bandwidth of LTE and NR, for example, 10 MHz, 15 MHz, and 20 MHz.

For LTE, as shown in FIG. 1, a minimum resource granularity in time domain is one orthogonal frequency division multiplexing (OFDM) symbol, and a minimum granularity in frequency domain is one subcarrier. One OFDM symbol and one subcarrier form one time-frequency resource element, that is, a resource element/resource element (RE). In other words, an RE is used as a basic unit for resource mapping at a physical layer. All OFDM symbols in one slot and 12 subcarriers in frequency domain may form a resource block (RB). An RB is used as a basic unit for LTE resource scheduling. One slot may include six or seven symbols. One frame is 10 ms and includes 10 subframes, and each subframe includes two slots.

Different than that in LTE, a quantity of slots included in one subframe in NR varies based on a subcarrier spacing, and a quantity of symbols in each slot is also different from that in LTE and is fixed at 14.

Table 1 compares signals used for network synchronization, cell coverage strength measurement, and channel estimation by using an LTE air interface technology and an NR air interface technology.

TABLE 1

| Function | 4G LTE | 5G NR |
|---|---|---|
| Synchronization between a terminal device and a network | PSS/SSS (cell level) | SSB (cell level) |
| Cell coverage strength measured by a terminal device | CRS (cell level) | SSB (cell level) |
| Channel estimation for demodulating data received by a terminal device | CRS (cell level) | DMRS (user level) |

It can be learned that, in LTE, the terminal device may implement synchronization by using a primary synchronization signal (PSS) and a secondary synchronization signal (SSS) that are broadcast by a base station. However, in NR, a concept of synchronization signal and physical broadcast channel block (SSB) is introduced. The SSB is mainly used for downlink synchronization and includes a PSS, an SSS, and a physical broadcast channel (PBCH). In other words, the PSS, the SSS, and the PBCH form an SSB in four consecutive OFDM symbols.

Figure 2B:
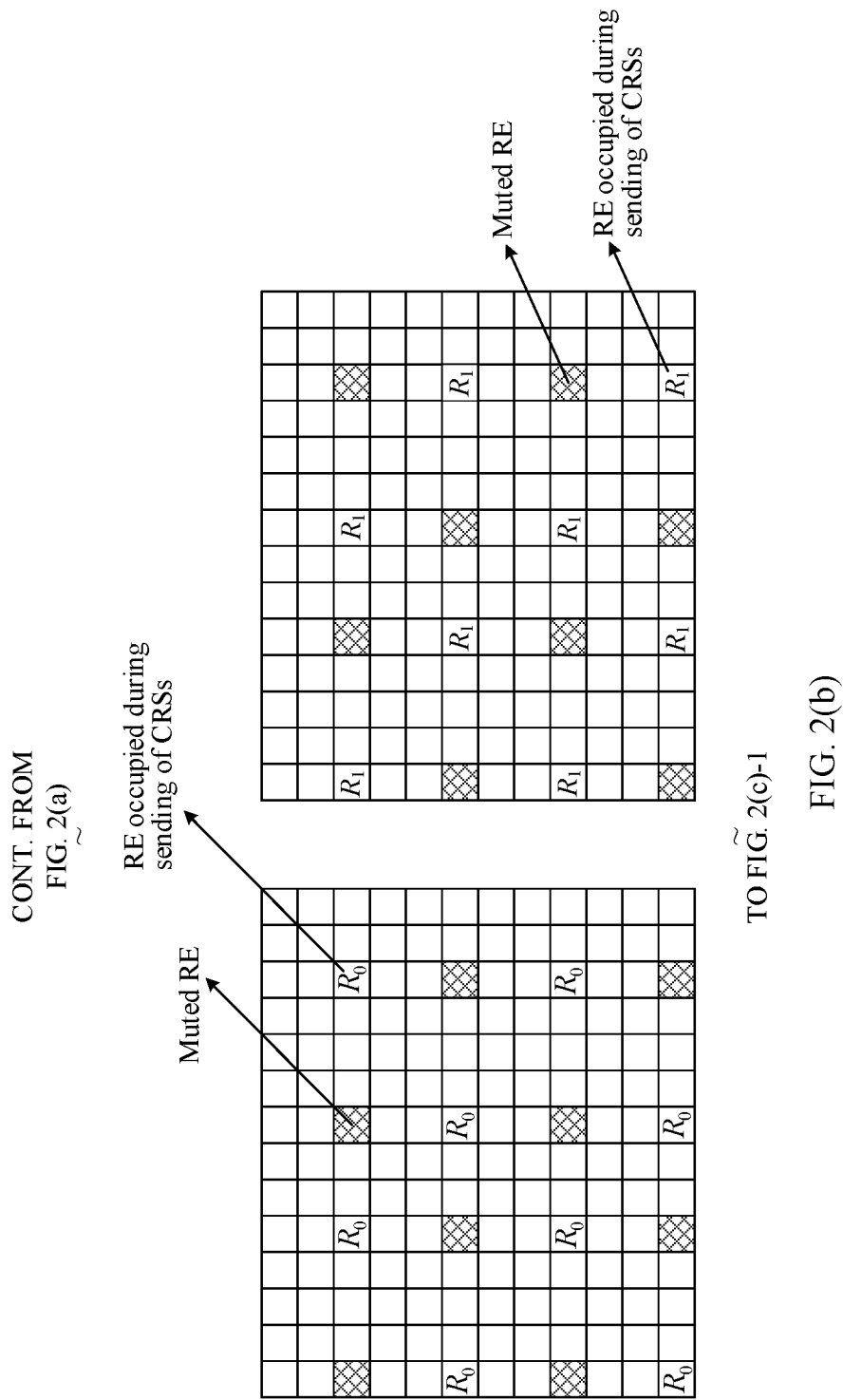
Figures 2, 2C:
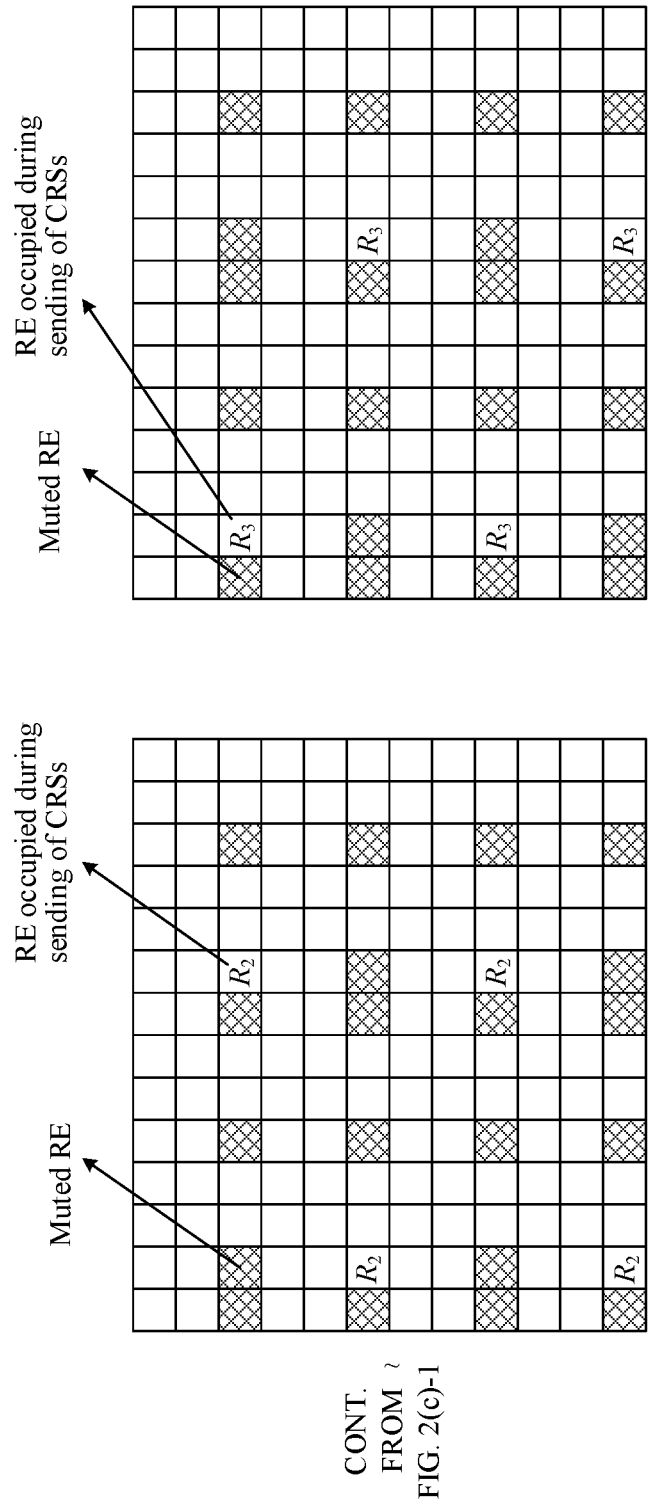

Because channel estimation directly determines modulation performance, the LTE air interface technology determines that resources for a cell reference signal (CRS) need to be densely distributed in entire time-frequency resource space. As shown in FIG. 2(a) to FIG. 2(c)-2, FIG. 2(a) shows REs occupied when CRSs are sent on one antenna port of a base station in an LTE cell; FIG. 2(b) shows REs occupied and REs that are muted to avoid transmission on other antennas in the LTE cell when CRSs are sent on two antenna ports of the base station; and FIG. 2(c)-1 and FIG. 2(c)-2 show REs occupied and REs that are muted to avoid transmission on other antennas in the LTE cell when CRSs are sent on four antenna ports of the base station.

Figure 3:
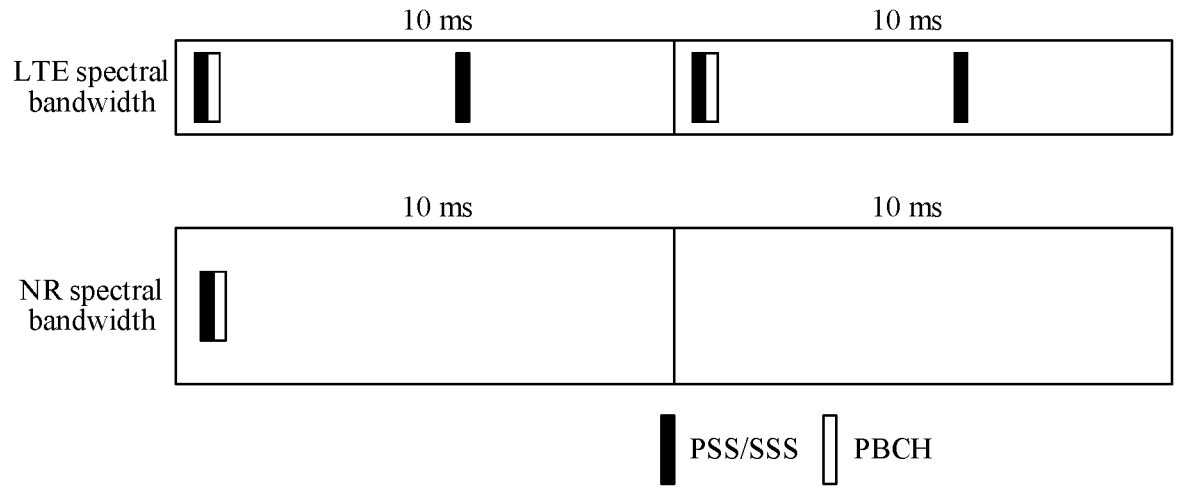
FIG. 3 is a schematic diagram of comparison between a time domain resource occupied by a synchronization signal and physical broadcast channel block (SSB) of a new radio (NR) cell in a periodicity of 20 ms and a time domain resource occupied by a primary synchronization signal (PSS)/secondary synchronization signal (SSS) of LTE in a subframe according to an embodiment of this application.

As shown in FIG. 3, although a spectrum width in NR is greater than a spectrum width in LTE, an SSB of an NR cell is not used for channel estimation. Therefore, in time domain, time domain resources occupied by the SSB of the NR cell in a periodicity of 20 ms are sparser than time domain resources occupied by a PSS/an SSS of LTE in a subframe. This can reduce resource overheads and improve resource utilization.

Figure 4:
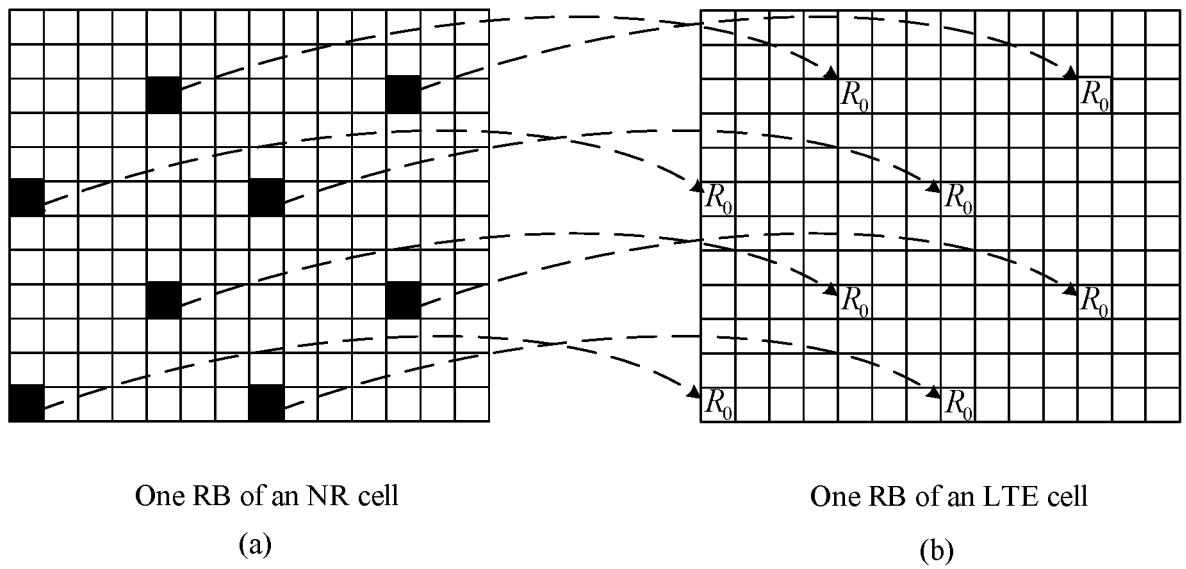
FIG. 4 is a schematic diagram of resource avoidance between a resource block (RB) in an NR cell and an RB in an LTE cell according to an embodiment of this application.

However, in a scenario of spectrum sharing, a difference between the two air interface technologies may cause a resource conflict. First, the NR cell needs to avoid a resource location at which the LTE cell sends a CRS, which decreases the resource utilization of the NR cell. For example, a terminal device in the NR cell may support avoidance via puncturing. FIG. 4 shows resource occupation statuses of one RB of an NR cell and one RB of an LTE cell. When resources for the NR cell need to avoid resources occupied by a CRS of the LTE cell, (a) in FIG. 4 shows an example of a location of an RE used by the NR cell and a location of an RE that needs to be punctured by the NR cell to avoid the resources for the CRS of the LTE cell. Correspondingly, (b) in FIG. 4 shows that RE locations of ROs are RE locations occupied by a CRS of the LTE cell in one RB, and a resource occupied by the CRS is at fixed RE locations in full bandwidth and the CRS is periodically sent.

Figure 5:
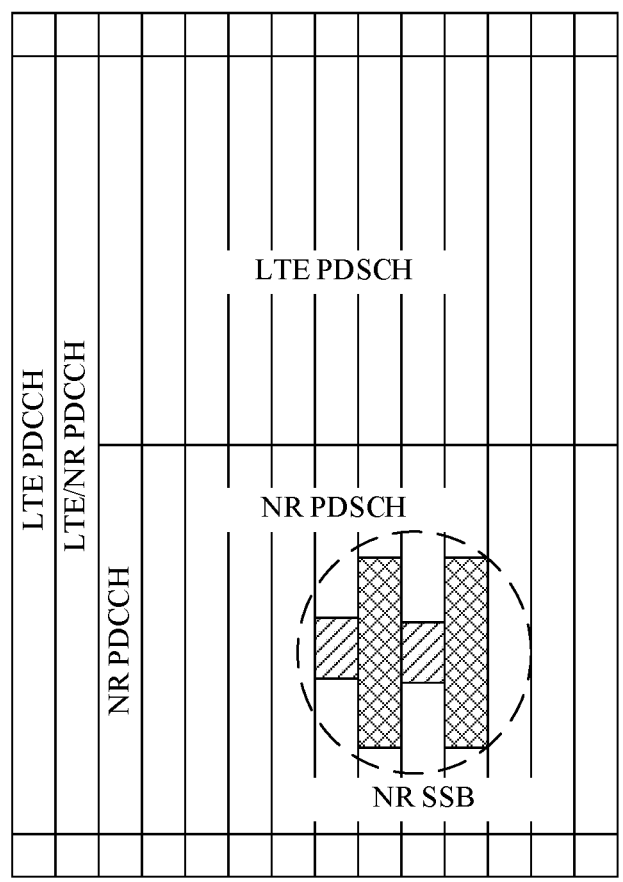
FIG. 5 is a schematic diagram of symmetric spectrum sharing between an LTE cell and an NR cell according to an embodiment of this application.

In addition, the LTE cell also needs to avoid resources for an SSB of the NR cell; otherwise, a terminal device in the NR cell may not be able to measure the NR cell. However, a terminal device in the LTE cell is usually a legacy terminal. As shown in FIG. 5, once RE locations occupied by some CRSs are punctured for sending an SSB by the NR cell, channel estimation performed by the terminal device in the LTE cell is distorted, affecting performance of the terminal device in the LTE cell. In addition, when a CRS of the LTE cell is used for channel estimation, joint channel estimation and filtering in time domain and frequency domain are used. Therefore, in the LTE cell, distortion of channel estimation on a CRS of a subframe affects not only an RB of a current slot, but also spreads to other RBs, and even leads to distortion of channel estimation on subsequent consecutive subframes.

Third, as shown in FIG. 5, physical downlink control channels (common PDCCH) of both the LTE cell and the NR cell are defined to occupy the first three symbols of each subframe. However, because resources occupied by CRSs of the LTE cell are excessively dense, for example, when the base station includes four antennas shown in FIG. 2(a) to FIG. 2(c)-2, the first two symbols of each subframe are occupied by the CRSs of the LTE cell. Therefore, the NR cell cannot use the first two symbols to send a PDCCH, and only the third symbol can be used for sending the PDCCH of the NR cell. As a result, only ⅓ of a resource capacity is left for the PDCCH of the NR cell.

Therefore, in a technology of spectrum sharing between an LTE cell and an NR cell, a performance loss of a terminal device caused by mutual avoidance of channels is currently a main challenge.

Figure 6:
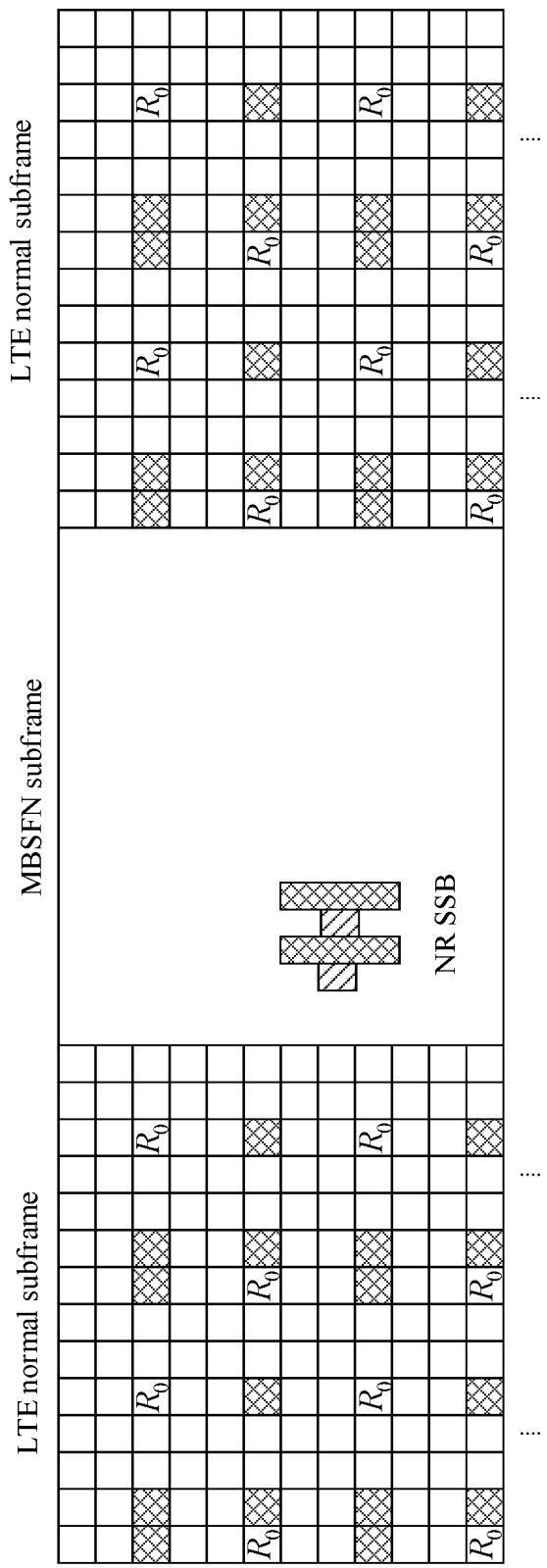
FIG. 6 is a schematic diagram of an multimedia broadcast single frequency network (MBSFN) mechanism in LTE according to an embodiment of this application.

Currently, such a performance loss may be reduced by using a multicast broadcast single frequency network (MBSFN) subframe that has been defined in LTE, to be specific, by inserting an MBSFN subframe between normal subframes in LTE, as shown in FIG. 6. The MBSFN subframe is a subframe format introduced in LTE to support a special broadcast service. If the MBSFN subframe is configured, an ordinary terminal device in the LTE cell does not perform CRS parsing for the MBSFN subframe. Therefore, deterioration of demodulation performance caused by distortion of channel estimation performed using the CRS can be avoided. In such an LTE MBSFN subframe, the NR cell may continue to be normally used to send an SSB, a broadcast message, and the like, and does not avoid sending of CRSs of the LTE cell.

However, the LTE cell cannot perform data transmission in the MBSFN subframe, in other words, one complete subframe is lost for the LTE cell. If the NR cell sends an SSB every 20 ms, three MBSFN subframes may need to be configured for LTE considering that the NR cell also needs to send other system information (e.g., remaining minimum system information, RMSI) and paging messages. As a result, 3/20=15% of available resources of the LTE cell are lost. This loss occurs even if there is no user in the NR cell, and is inevitable provided that the NR cell is configured and shares a same spectrum with the LTE cell.

Second, not all LTE terminal devices can identify the MBSFN subframe, and subframes before and after the MBSFN subframe are used by the terminal device to perform CRS measurement and channel estimation. Once a low-end LTE terminal device cannot identify the MBSFN subframe, the foregoing problem of a demodulation channel estimation loss caused by CRS distortion continues to exist and spreads to adjacent frames before and after the MBSFN subframe. Consequently, the loss of the available resources of the LTE cell is increased to 7/20=35%.

Third, the MBSFN subframe does not resolve the problem of an insufficient PDCCH capacity of the NR cell.

Therefore, an embodiment of this application provides a resource configuration method to solve a problem that demodulation performance of a conventional LTE terminal device deteriorates because a CRS of an LTE cell needs to avoid an SSB of an NR cell. The method may be applied to a base station to configure a resource for a signal in the LTE cell and configure a resource for a signal in the NR cell. In this method, asymmetric spectrum sharing is proposed. An NR bandwidth for spectrum sharing by an LTE cell and an NR cell of a base station is greater than an LTE bandwidth. There is a dedicated bandwidth for the NR cell in the NR bandwidth, and the dedicated bandwidth is not shared with the LTE cell. Therefore, a signal allocated in the dedicated bandwidth for the NR cell is not interfered with by a signal sent by the LTE cell, and correspondingly, a signal sent in the dedicated bandwidth for the NR cell does not interfere with sending of a signal of the LTE cell. In this way, by applying the methods in this application, an MBSFN subframe does not need to be configured for the LTE cell, thereby reducing a loss of the LTE cell, and further avoiding a compatibility problem that a low-end terminal device in LTE cannot identify the MBSFN subframe. These methods implement smooth evolution from $4^{th}$ generation mobile communication technology (4G) to $5^{th}$ generation mobile communication technology (5G).

Figure 7:
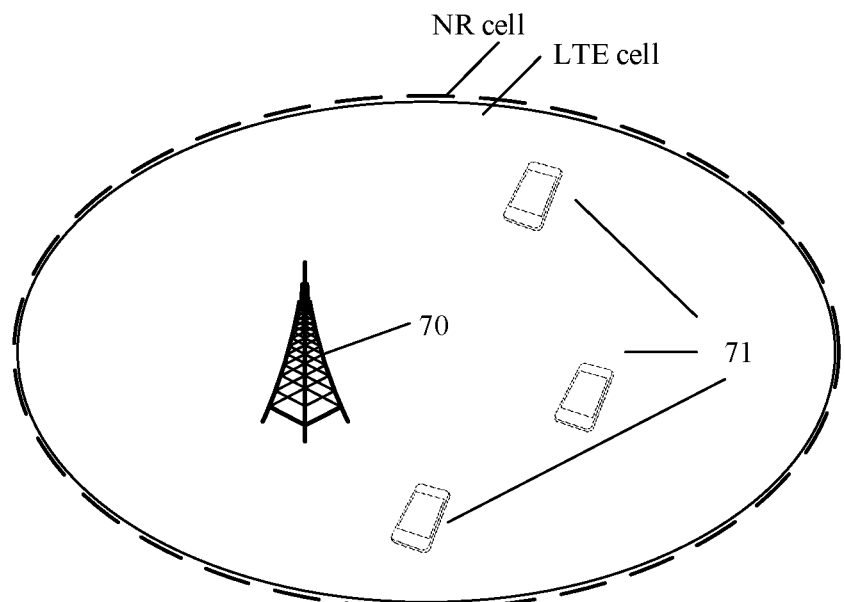
FIG. 7 is a schematic diagram of a network architecture according to an embodiment of this application.
Figure 8:
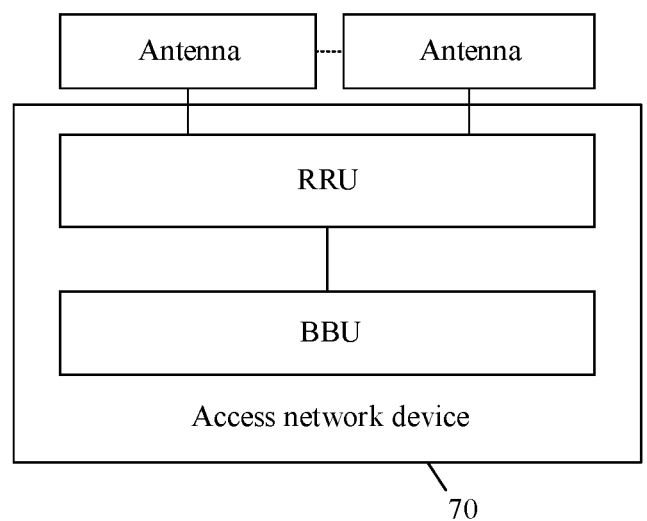
FIG. 8 is a schematic structural diagram of an access network device according to an embodiment of this application.

As shown in FIG. 7, a network architecture in this application may include an access network device 70 and a terminal device 71. The access network device 70 may include a base band unit (BBU) and a remote radio unit (RRU)/active antenna unit (AAU). Because this application relates to spectrum sharing between 4G and 5G, the BBU and the RRU/AAU may need to have a capability of processing both an LTE signal and an NR signal. As shown in FIG. 8, the RRU in the access network device 70 is connected to an antenna feeder system (that is, an antenna) (where the RRU and the antenna may form an AAU), and the BBU and the RRU may be separated for use as required. It should be noted that, in a some implementations, the access network device 70 may also use another universal hardware architecture, and is not limited to the universal hardware architecture shown in FIG. 8.

In some embodiments, the NR cell and the LTE cell share one BBU. In other words, under one BBU, a coverage range of the NR cell is the same as a coverage range of the LTE cell. In some other embodiments, the NR cell corresponds to one BBU, the LTE cell corresponds to one BBU, and the BBU of the NR cell and the BBU of the LTE cell communicate in a wired/wireless mode.

The terminal device may be implemented by using a structure shown in FIG. 9. For example, a terminal device 900 is a mobile phone, and FIG. 9 shows a universal hardware architecture of the mobile phone for description. The mobile phone shown in FIG. 9 may include components such as a radio frequency (RF) circuit 910, a memory 920, another input device 930, a display screen 940, a sensor 950, an audio circuit 960, an input/output (I/O) subsystem 970, a processor 980, and a power supply 990. A person skilled in the art may understand that a structure of the mobile phone shown in FIG. 9 does not constitute any limitation on the mobile phone, and may include more or fewer components than those shown in the figure, or some components may be combined, or some components may be split, or different component arrangements may be used. A person skilled in the art may understand that the display screen 940 is a user interface (UI), and the display screen 940 may include a display panel 941 and a touch panel 942. In addition, the mobile phone may include more or fewer components than those shown in the figure. Although not shown, the mobile phone may further include functional modules or components such as a camera and a Bluetooth module. Details are not described herein again.

Further, the processor 980 is connected to the RF circuit 910, the memory 920, the audio circuit 960, the I/O subsystem 970, and the power supply 990 respectively. The I/O subsystem 970 is connected to the another input device 930, the display screen 940, and the sensor 950 respectively. The RF circuit 910 may be configured to receive and send a signal during an information receiving and sending process or during a call process. In particular, after receiving downlink information of a base station, the RF circuit sends the downlink information to the processor 980 for processing. The memory 920 may be configured to store a software program and a software module. By running the software program and module stored in the memory 920, the processor 980 performs various function applications and data processing of the mobile phone. The another input device 930 may be configured to receive inputted digital or character information, and generate a key signal input related to user settings and function control of the mobile phone. The display screen 940 may be configured to display information inputted by a user or information provided for a user and various menus of the mobile phone, and may further receive a user input. The sensor 950 may be an optical sensor, a motion sensor, or another sensor. The audio circuit 960 may provide an audio interface between a user and the mobile phone. The I/O subsystem 970 is configured to control an external input/output device, and the external device may include an input controller, a sensor controller, and a display controller of another device. The processor 980 is a control center of the mobile phone 900. The processor is connected to each part of the entire mobile phone through various interfaces and cables. In addition, the processor performs various functions of the mobile phone 900 and processes data by miming or executing the software program and/or module that are/is stored in the memory 920 and invoking data stored in the memory 920, to perform overall monitoring on the mobile phone. The power supply 990 (such as a battery) is configured to supply power to the foregoing components. Preferably, the power supply may be logically connected to the processor 980 by using a power management system, to implement functions such as charging, discharging, and power consumption management by using the power management system.

By applying the foregoing network architecture, the following describes the resource configuration method provided in this application.

An embodiment of this application provides a resource configuration method. As shown in FIG. 10, the method includes the following steps.

101. An access network device obtains first configuration information, where the first configuration information includes a bandwidth range of an NR cell, and the bandwidth range of the NR cell includes a dedicated frequency domain resource of the NR cell and a frequency domain resource shared by the NR cell and an LTE cell.

In some embodiments, the access network device may include a BBU, an RRU, and an antenna, or the access network device includes a BBU and an AAU. The obtaining first configuration information may be performed by the BBU in the access network device. The first configuration information may be configured for the BBU manually or in another manner.

Figure 11:
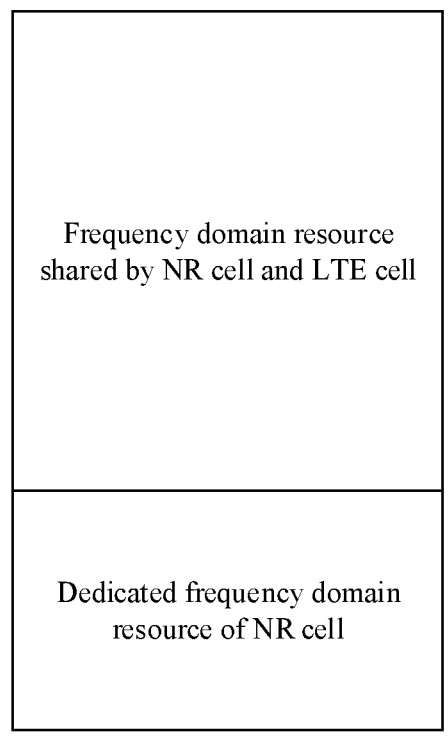
FIG. 11 is a schematic diagram of distribution of frequency domain resources of an NR cell according to an embodiment of this application.

In the current technology, the NR cell and the LTE cell share symmetric spectra, that is, the bandwidth range of the NR cell is the same as a bandwidth range of the LTE cell. Different than the current technology, as shown in FIG. 11, the bandwidth range configured for the NR cell in this application includes the dedicated frequency domain resource of the NR cell and the frequency domain resource shared by the NR cell and the LTE cell.

In this way, the access network device may configure, in the dedicated frequency domain resource of the NR cell, relatively important signals that are prone to interference in the NR cell. These signals may include a synchronization channel, a broadcast channel, a system message, a paging channel, a random access channel, and the like of the NR cell.

102. The access network device sends the first configuration information to a terminal device in the NR cell.

The BBU may send the obtained first configuration information to the terminal device by using the RRU/AAU. Correspondingly, the terminal device may receive, based on the first configuration information, a signal sent by the access network device. When the terminal device receives the foregoing relatively important signals that are prone to interference, because resources allocated to these signals are on the dedicated frequency domain resource of the NR cell, the terminal device in the NR cell does not need to avoid a signal of the LTE cell when receiving these signals, for example, does not need to avoid a CRS signal of the LTE cell. Correspondingly, demodulation channel estimation distortion caused by the CRS of the LTE cell avoiding a signal of the NR cell can also be avoided.

The following further describes the embodiments of this application.

Figure 12:
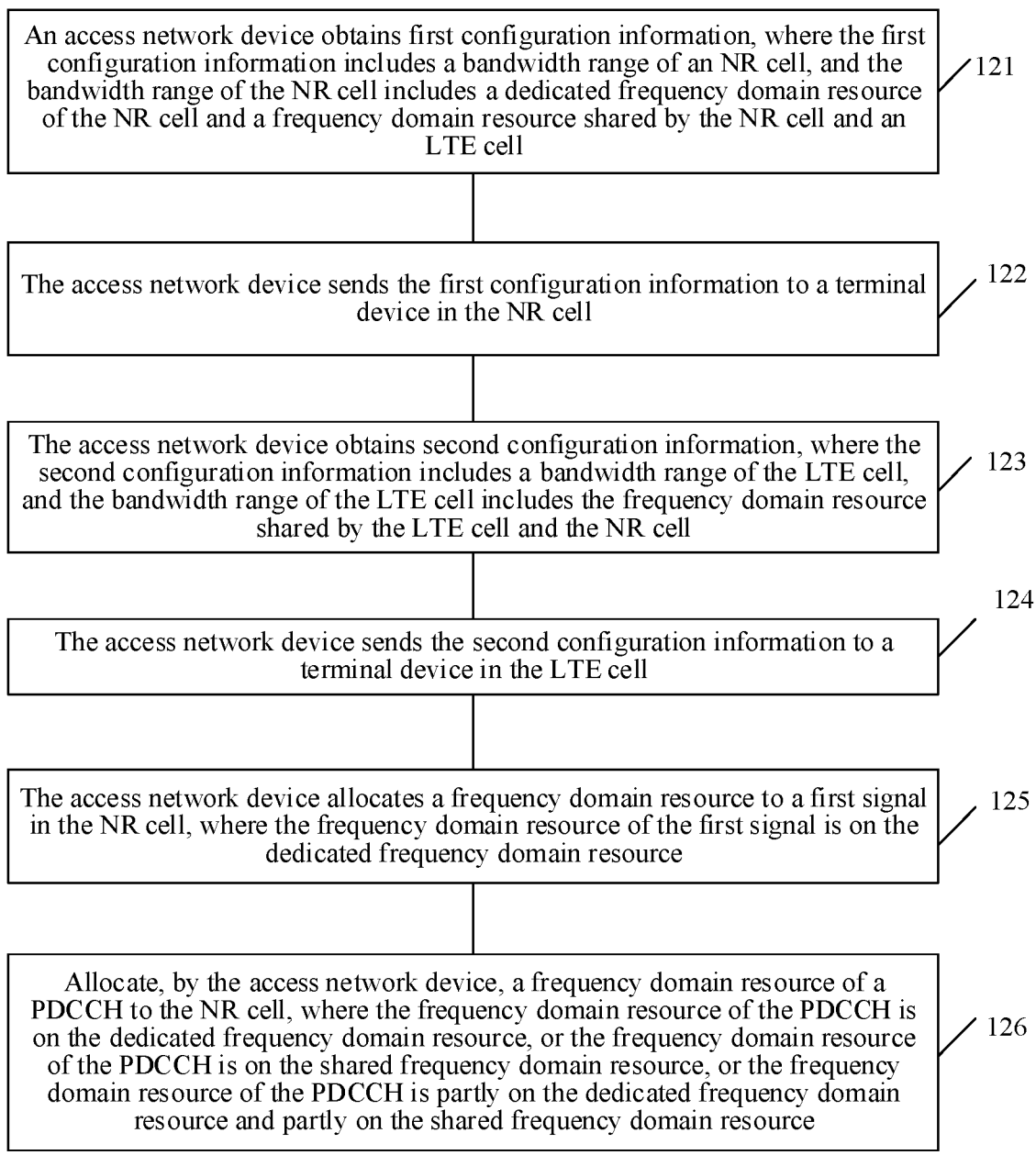
FIG. 12 is a schematic flowchart of a resource configuration method according to an embodiment of this application.

An embodiment of this application provides a resource configuration method. As shown in FIG. 12, the method includes the following steps:

121. An access network device obtains first configuration information, where the first configuration information includes a bandwidth range of an NR cell, and the bandwidth range of the NR cell includes a dedicated frequency domain resource of the NR cell and a frequency domain resource shared by the NR cell and an LTE cell.

Figure 13:
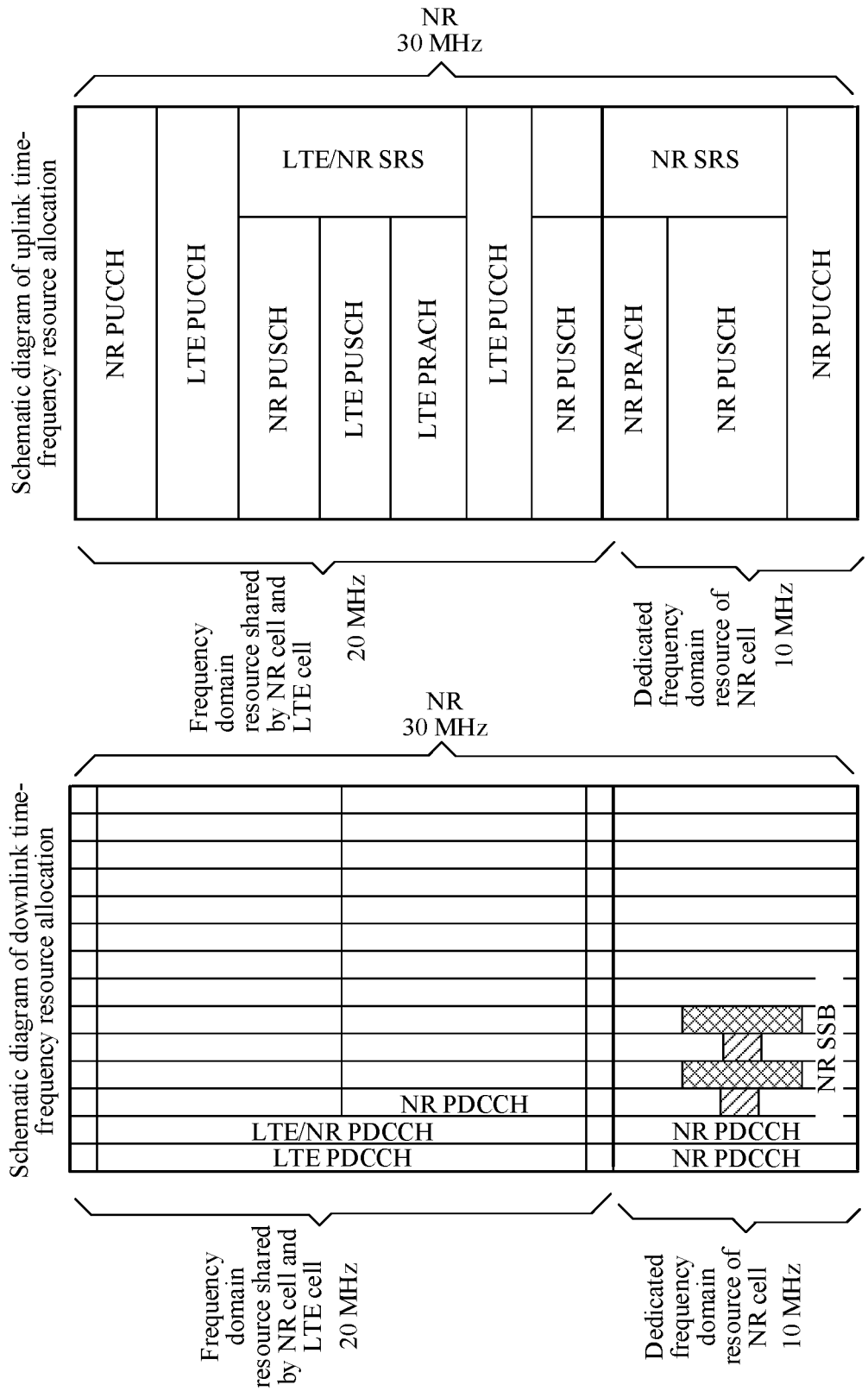
FIG. 13 is a schematic diagram of distribution of uplink time-frequency resources and downlink time-frequency resources of an NR cell and an LTE cell according to an embodiment of this application.

In some embodiments, as shown in FIG. 13, a bandwidth range configured by a BBU for the NR cell may include a bandwidth value and a frequency location. For example, the bandwidth value may be 30 MHz, and the frequency location may indicate an FR1 frequency, an FR2 frequency, or the like. Alternatively, the bandwidth range may include a start frequency and an end frequency of a bandwidth. For example, the start frequency is 2110 MHz, and the end frequency is 2140 MHz. When the bandwidth value is 30 MHz, the 30 MHz bandwidth includes the dedicated frequency domain resource of the NR cell, for example, 10 MHz. In other words, only the NR cell allocates a resource on the 10 MHz, and does not share the 10 MHz resource with the LTE cell. The 30 MHz bandwidth further includes the 20 MHz frequency domain resource shared by the NR cell and the LTE cell. In other words, both the NR cell and the LTE cell can allocate a resource on the 20 MHz.

The bandwidth range of the NR cell is applicable to uplink and downlink time-frequency resource allocation in the NR cell.

122. The access network device sends the first configuration information to a terminal device in the NR cell.

In some embodiments, the BBU may carry the first configuration information in a first system message, and periodically send the first system message in a broadcast manner to the terminal device in the NR cell, so that the terminal device that may need to access the NR cell learns, in a timely manner, the bandwidth range allocated to the NR cell. Correspondingly, the terminal device in the NR cell may receive the first configuration information of the NR cell sent by the BBU.

123. The access network device obtains second configuration information, where the second configuration information includes a bandwidth range of the LTE cell, and the bandwidth range of the LTE cell includes the frequency domain resource shared by the LTE cell and the NR cell.

As shown in FIG. 13, the BBU may further configure a bandwidth range for the LTE cell, where the bandwidth range includes the frequency domain resource shared by the LTE cell and the NR cell. Similar to the NR cell, the bandwidth range configured by the BBU for the LTE cell may also include a bandwidth value and a frequency location, or include a start frequency and an end frequency of a bandwidth. For example, when the bandwidth value is 20 MHz, it means that the 20 MHz is a frequency domain resource shared by the LTE cell and the NR cell. The bandwidth range of the LTE cell is applicable to uplink and downlink time-frequency resource allocation in the LTE cell.

It may also be understood that the bandwidth range of the NR cell configured by the BBU in this application is greater than the bandwidth range of the LTE cell. When the bandwidth range of the NR cell is 30 MHz, and the bandwidth range of the LTE cell is 20 MHz, the bandwidth of the NR cell is 10 MHz greater than the bandwidth of the LTE cell. 20 MHz in the bandwidth of the NR cell is the frequency domain resource shared with the LTE cell, and 10 MHz in the bandwidth of the NR cell is the dedicated frequency domain resource of the NR cell.

124. The access network device sends the second configuration information to a terminal device in the LTE cell.

Correspondingly, the terminal device in the LTE cell may receive the second configuration information of the LTE cell sent by the BBU.

Similar to the NR cell, the BBU may carry the second configuration information in a second system message, and periodically send the second configuration information in a broadcast manner to the terminal device in the LTE cell, so that the terminal device that may need to access the LTE cell learns, in a timely manner, the bandwidth range allocated to the LTE cell.

It should be noted that one access network device may cover both the NR cell and the LTE cell, and coverage ranges of the NR cell and the LTE cell are the same. In this case, both the first configuration information and the second configuration information may be sent to an RRU/AAU by using one BBU and then broadcast. Alternatively, in non-standalone (NSA) networking, information about the NR cell may be forwarded to the terminal device in the NR cell by using the LTE cell. That is, if the access network device includes a BBU1, a BBU2, an RRU, and an antenna, the BBU1 corresponds to the NR cell, the BBU2 corresponds to the LTE cell, and when the BBU1 broadcasts the first configuration information to the terminal device in the NR cell, the BBU1 may first send the first configuration information to the BBU2, the BBU2 sends the first configuration information to the RRU, and then the RRU broadcasts the first configuration information by using the antenna; and the BBU2 directly broadcasts the second configuration information by using the RRU and the antenna. Certainly, the access network device may alternatively be that different BBUs correspond to different RRUs, that is, a BBU sends configuration information by using a corresponding RRU and an antenna.

It should be noted that an execution sequence of steps 121 and 122 and steps 123 and 124 may be adjusted, or may be performed simultaneously. Step 124 is optional. Alternatively, the access network device may send the second configuration information to another access network device, and the another access network device sends the second configuration information.

125. The access network device allocates a frequency domain resource to a first signal in the NR cell, where the frequency domain resource of the first signal is on the dedicated frequency domain resource.

The BBU may allocate, on the dedicated frequency domain resource of the NR cell, frequency domain resources to some relatively important signals that are prone to interference and that affect access of the terminal device, where these signals are defined as the first signal.

In other words, when the BBU may need to allocate a frequency domain resource to the first signal, the BBU may allocate the resource on the dedicated frequency domain resource of the NR cell.

In some embodiments, the first signal may include at least one of the following signals: a signal used by the terminal device to synchronize with the access network device, a signal used by the terminal device to perform a timing function with the access network device, a signal used by the terminal device to obtain cell channel state information, a signal used by the terminal device to determine a cell to be camped on, and a signal used by the terminal device to access the access network device.

In some embodiments, the signal used by the terminal device to synchronize with the access network device may include an SSB;

the signal used by the terminal device to perform a timing function with the access network device may include a tracking reference signal (TRS);

the signal used by the terminal device to evaluate the cell channel state information may include a channel state information-reference signal (CSI-RS) and a demodulation reference signal (DMRS);

the signal used by the terminal device to determine a cell to be camped on may include a common PDCCH: and the signal used by the terminal device to access the access network device may include a physical random access channel (PRACH).

FIG. 13 is a schematic diagram of distribution of uplink time-frequency resources and downlink time-frequency resources of an LTE cell and an NR cell, where a frequency domain resource shared by the NR cell and the LTE cell and a dedicated frequency domain resource of the NR cell are shown. It should be understood that although the dedicated frequency domain resource shown in FIG. 13 includes a frequency domain resource of a PDCCH, a frequency domain resource of an SSB, and a frequency domain resource of a PRACH of the NR cell, the dedicated frequency domain resource may further include frequency domain resources of the TRS, the CSI-RS, the DMRS, and the like.

After the terminal device in the NR cell enters the NR cell and performs a random access procedure, the BBU may allocate a time-frequency resource of the NR cell to the terminal device in the NR cell in a subsequent access procedure by applying the foregoing signal that can be used for allocating a resource on a dedicated time-frequency resource.

In some embodiments, in the access procedure after random access, after the BBU allocates the frequency domain resource of the SSB on the dedicated frequency domain resource, correspondingly, the terminal device may learn a time-frequency resource of the SSB by searching for a synchronization channel on different frequencies. A frequency domain resource in the determined time-frequency resource of the SSB is on the dedicated frequency domain resource of the NR cell.

The BBU may carry a time-frequency resource of the PRACH of the NR cell and a time-frequency resource of the common PDCCH in the broadcast SSB. The resource of the PRACH of the NR cell carried in the SSB is on the dedicated frequency domain resource of the NR cell. Correspondingly, when determining the time-frequency resource of the SSB, the terminal device may receive the SSB on the time-frequency resource of the SSB. When determining, by parsing the SSB, that the measured SSB meets camping and access thresholds, the terminal device may obtain the time-frequency resource of the PRACH from the SSB, and the time-frequency resource of the PRACH determined by the terminal device is on the dedicated frequency domain resource of the NR cell. In this way, the terminal device may receive the PRACH on the determined frequency domain resource of the PRACH, and access the NR cell on the PRACH.

Similarly, the resource of the common PDCCH carried in the SSB is also on the dedicated frequency domain resource of the NR cell. Correspondingly, when receiving the SSB, the terminal device may obtain the time-frequency resource of the common PDCCH by parsing the SSB, and the tune-frequency resource of the common PDCCH determined by the terminal device is on the dedicated frequency domain resource of the NR cell. In this way, the terminal device may receive the common PDCCH on the determined frequency domain resource of the common PDCCH.

In this way, when the BBU allocates the frequency domain resource of the SSB of the NR cell on the dedicated frequency domain resource of the NR cell, the SSB can be prevented from being interfered with by a CRS sent by the LTE cell, and interference caused by the SSB sent by the NR cell to a legacy terminal device in the LTE cell can also be avoided.

126. The access network device allocates a frequency domain resource of a PDCCH to the NR cell, where the frequency domain resource of the PDCCH is on the dedicated frequency domain resource, or the frequency domain resource of the PDCCH is on the shared frequency domain resource, or one part of the frequency domain resource of the PDCCH is on the dedicated frequency domain resource and the other part is on the shared frequency domain resource.

After the terminal device accesses the NR cell, the BBU may perform data communication with the terminal device. In the data communication process, if the BBU needs to send data to the terminal device, the BBU may first send downlink control information (DCI) to the terminal device. The DCI carries a time-frequency resource of a PDCCH allocated by the BBU to the NR cell. Referring to FIG. 13, the allocated frequency domain resource may be on the dedicated frequency domain resource of the NR cell, or may be on the shared frequency domain resource, or one part may be on the dedicated frequency domain resource and the other part may be on the shared frequency domain resource, so that the BBU may send the PDCCH to the terminal device on the time-frequency resource of the PDCCH.

Correspondingly, when receiving the DCI, the terminal device may obtain the time-frequency resource of the PDCCH by demodulating the DCI. A frequency domain resource in the time-frequency resource of the PDCCH may be on the dedicated frequency domain resource of the NR cell, or may be on the shared frequency domain resource, or one part may be on the dedicated frequency domain resource and the other part may be on the shared frequency domain resource. In this way, the terminal device may receive the PDCCH on the determined time-frequency resource of the PDCCH.

In some embodiments, when allocating the frequency domain resource of the PDCCH to the terminal device, the BBU may determine a location of the frequency domain resource based on a user level, a service type, and the like of the terminal device. For example, a frequency domain resource of a PDCCH allocated to a terminal device with a relatively high user level may be on the dedicated frequency domain resource of the NR cell, and a frequency domain resource of a PDCCH allocated to a terminal device with a relatively low user level may be on the shared frequency domain resource, or one part of allocated frequency domain signal is on the dedicated frequency domain resource and the other part is on the shared frequency domain resource. Alternatively, a frequency domain resource of a PDCCH allocated to a terminal device with a relatively high service type priority, may be on the dedicated frequency domain resource of the NR cell, and a frequency domain resource of a PDCCH allocated to a terminal device with a relatively low service type priority may be on the shared frequency domain resource, or one part of allocated frequency domain signal is on the dedicated frequency domain resource and the other part is on the shared frequency domain resource.

In some embodiments, an RB that is in the dedicated frequency domain resource of the NR cell and that is allocated by the BBU may be comprehensively scheduled and allocated with an RB that is in the shared frequency domain resource and that is dynamically allocated to the NR cell, so that available resources of the NR cell can be maximized For example, referring to FIG. 13, a frequency domain resource of a physical uplink control channel (PUCCH) of the NR cell may be partly in the dedicated frequency domain resource and partly in the shared frequency domain resource of the NR cell. Resource allocation mariners of a physical uplink shared channel (PUSCH), a PDCCH, a physical downlink shared channel (PDSCH), and a PUCCH of an NR cell are similar, and in all these resource allocation manners, an RB in the dedicated frequency domain resource of the NR cell may be comprehensively scheduled and allocated with an RB that is in the shared frequency domain resource and that is dynamically allocated to the NR cell.

In addition, when the access network device allocates a frequency domain resource to a second signal in the NR cell, the access network device may preferentially allocate the dedicated frequency domain resource to the second signal.

In some embodiments, the second signal includes any one of the following signals: a PDCCH, a PDSCH, a PUCCH, and a PUSCH.

Referring to FIG. 13, frequency domain resources of these second signals may be allocated on the dedicated frequency domain resource or the shared frequency domain resource of the NR cell. In other words, when the frequency domain resource available to the second signal is on both the dedicated frequency domain resource and the shared frequency domain resource, the BBU preferentially allocates the dedicated frequency domain resource to the second signal. In this way, when the second signal is sent on the dedicated frequency domain resource, interference from a signal sent by the LTE cell can be avoided, and interference to the signal sent by the LTE cell can also be avoided.

In some embodiments, when the BBU configures a PDCCH in a downlink time-frequency resource of the LTE cell, in the current technology, a time domain resource is generally allocated as the first three symbols in each slot. To avoid resources occupied by a CRS sent by the LTE cell in the zeroth symbol, only the first symbol and the second symbol can be allocated to the PDCCH of the NR cell. However, if the dedicated frequency domain resource of the NR cell is set according to this application, the BBU may allocate the first three symbols to the PDCCH of the NR cell on the dedicated frequency domain resource of the NR cell.

For example, referring to FIG. 13, the PDCCH of the NR cell may occupy the zeroth symbol, the first symbol, and the second symbol in a 10 M frequency domain resource that is dedicated to the NR cell and that is configured by the BBU. In this way, a PDCCH resource capacity of the NR cell can be increased, the performance deterioration of the NR cell caused by insufficient control channels can be avoided, and the quantity of UEs that can be admitted by the NR cell can be increased.

In some embodiments, because the LTE air interface technology determines that resources for a CRS need to be densely distributed in entire time-frequency resource space, the resources for a CRS are densely distributed in the shared frequency domain resource. If frequency domain resources of some downlink time-frequency resources allocated by the BBU to the NR cell are on the shared frequency domain resource, the BBU needs to puncture some time-frequency resources of the NR cell and deliver a rate matching template to avoid a resource conflict with a CRS of the LTE cell. Correspondingly, the terminal device may need to identify and avoid locations of the punctured resources based on the rate matching template, to demodulate and restore data. In other words, based on the rate matching template, the terminal device may determine that some REs are punctured, that is, no data is received on the REs, and therefore may not demodulate signals of these REs.

For example, when the BBU determines that the shared frequency domain resource is to be allocated to the PDCCH or the PDSCH of the NR cell, the BBU may send the rate matching template to the terminal device in the NR cell. The rate matching template indicates the terminal device not to receive, when receiving the PDCCH or the PDSCH, data on a resource indicated by the rate matching template.

In other words, if the frequency domain resource allocated by the BBU to the PDCCH or the PDSCH of the NR cell includes the frequency domain resource shared by the NR cell and the LTE cell, to avoid a resource conflict with the CRS of the LTE cell, the BBU may need to puncture some time-frequency resources of the PDCCH or the PDSCH and deliver the rate matching template. Correspondingly, the terminal device may identify punctured REs based on the rate matching template, to skip receiving data on these punctured REs.

In some embodiments, when the BBU allocates resources in the dedicated frequency domain resource of the NR cell to some important signals in the NR cell, if the BBU allocates a time-frequency domain resource to the LTE cell, resource allocation of the LTE cell may comply with an LTE protocol constraint. For example, it is constrained in a protocol that a frequency domain resource of a PUCCH of an LTE cell is at two ends of an LTE bandwidth range. In this case, in this application, the frequency domain resource of the PUCCH of the LTE cell may also be distributed at two ends of the shared frequency domain resource.

In the embodiments of this application, because the BBU may need to send a signal to the terminal device by using the RRU/AAU, the first configuration information, the second configuration information, the frequency domain resource of the first signal, the frequency domain resource of the second signal, and the like obtained by the BBU in this application may all need to be sent to the terminal device by using the RRU/AAU. Therefore, the RRU/AAU side may also need to support a resource configuration of the BBU in this application.

In some embodiments, the BBU may send the first configuration information and the second configuration information to the RRU/AAU, to notify the RRU/AAU to learn the bandwidth range of the NR cell and the bandwidth range of the LTE cell that are configured by the BBU.

The BBU may further send third configuration information to the RRU/AAU, where the third configuration information includes first indication information and second indication information, the first indication information indicates a frequency domain resource location of the NR cell, and the second indication information indicates a frequency domain resource location of the LTE cell. Correspondingly, the RRU/AAU may receive the third configuration information sent by the BBU.

The frequency domain resource location of the NR cell includes a dedicated frequency domain resource location, and the dedicated frequency domain resource location includes a frequency domain resource location of an SSB of the NR cell, a frequency domain resource location of a PRACH of the NR cell, a partial resource location of a frequency domain resource of a PDCCH of the NR cell, and the like.

In this way, when sending a signal to the terminal device, the RRU/AAU can support the principle of resource allocation by the BBU.

In conclusion, the resource configuration method provided in this application may be a more robust spectrum sharing method. When there is no NR user, by applying this application, user perception of a low-end LTE terminal device in an LTE cell is not affected. That is, a user of a conventional LTE terminal device does not perceive existence of an NR cell. Therefore, the terminal device in the LTE cell may continue to access the LTE cell and perform uplink and downlink data transmission based on a resource allocated by the BBU. In this application, some common channels (for example, SSBs) of the NR cell that may need to be avoided are allocated on the dedicated frequency domain resource. Therefore, no common channel of the NR cell that needs to be avoided exists within the bandwidth range of the LTE cell. In this way, a user of a terminal device in the LTE cell can enjoy up to a maximum of 100% 4G peak experience.

The frequency domain resource division method shown in FIG. 13 is used as an example. The terminal device in the NR cell may determine that an available bandwidth range is 30 MHz. However, if overheads of a control channel in LTE are deducted from an actual available bandwidth range, the actual available bandwidth range may be approximately a dedicated bandwidth range 10 MHz plus 90% of a shared bandwidth range 20 MHz, that is, 10+20*90%=28 MHz. The terminal device in the LTE cell may determine that an available bandwidth range is 20 MHz. In this way, when there is no NR user in the NR cell, an actual available bandwidth range of the terminal device in the LTE cell is 20 MHz, and the terminal in the LTE cell does not need to support carrier aggregation or an MBSFN subframe.

If the resource configuration method in this application is not used, the 30 MHz bandwidth is divided into two carriers: 20 MHz and 10 MHz, each carrier may need to support spectrum sharing between an LTE cell and an NR cell, and a single terminal device combines resources of the two carriers in a carrier aggregation manner. An effect may be as follows:

(1) The terminal device in the NR cell may determine that the NR cell is obtained by performing carrier aggregation on a 20 MHz NR cell and a 10 MHz NR cell. In this case, an actual available resource of the terminal device in the NR cell minus overheads of a control channel of the LTE cell is approximately 20*90%+10*90%=27 MHz. If the terminal device in the NR cell does not support carrier aggregation, the terminal device can only determine that a bandwidth range of the NR cell is 20 MHz, and an actual available bandwidth resource is 20*90%=18 MHz. Compared with the resource configuration method in this application, when the resource configuration method in this application is not used, an actual available bandwidth resource of the terminal device in the NR cell is less than an actual available bandwidth resource of the terminal device when the resource configuration method in this application is used.

(2) The terminal device in the LTE cell may determine that the LTE cell is obtained by performing carrier aggregation on a 20 MHz LTE cell and a 10 MHz LTE cell. Because the LTE cell needs to avoid a control channel such as an SSB of the NR cell, the LTE cell can use only an MBSFN mechanism. In this case, an actual available resource of the 20 MHz LTE cell is approximately 20*85%=17 MHz, and an actual available resource of the 10 MHz LTE cell is approximately 10*85%=8.5 MHz. If the terminal device in the LTE cell supports an MBSFN mechanism and a carrier aggregation mechanism (where a relatively small quantity of terminal devices support both the two mechanisms in a current LEE legacy network), the terminal device in the LTE cell may use a bandwidth of about 25.5 MHz. If the terminal device in the LTE cell supports the carrier aggregation mechanism but does not support the MBSFN mechanism, performance of the terminal device deteriorates. A specific deterioration degree is related to internal implementation of the terminal device, and only about 20*65%+10*65%=19.5 MHz resource is finally available. If the terminal device in the LTE cell does not support the carrier aggregation mechanism but supports the MBSFN mechanism, a final available resource of the terminal device in the LTE cell is only approximately 17 MHz.

In this way, in the resource configuration method in this application, the MBSFN mechanism does not need to be used, to resolve the problem that demodulation performance of a terminal device in an LTE cell deteriorates because a CRS in LTE avoids an SSB in NR, that is, a compatibility problem of a legacy terminal device during use of the MBSFN mechanism can be avoided. In addition, when there is no NR user in an NR cell, no performance loss of the legacy LTE terminal device can be achieved. In addition, according to the resource configuration method in this application, the terminal device in the NR cell and the terminal device in the LTE cell can obtain relatively high available bandwidth resources, thereby maximizing utilization of frequency domain resources.

It may be understood that, to implement the foregoing functions, the communication apparatus includes corresponding hardware and/or software modules for performing the functions. The communication apparatus may be the foregoing access network device or BBU. Algorithm steps in the examples described with reference to the embodiments disclosed in this specification can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application with reference to the embodiments, but it should not be considered that the implementation goes beyond the scope of this application.

In the embodiments, functional module division may be performed on the communication apparatus based on the foregoing method examples. For example, various functional modules may be divided corresponding to various functions, or two or more functions may be integrated into one processing module. The integrated module may be implemented by hardware. It should be noted that, module division in the embodiments is an example and is merely logical function division. During actual implementation, there may be another division manner.

Figure 14:
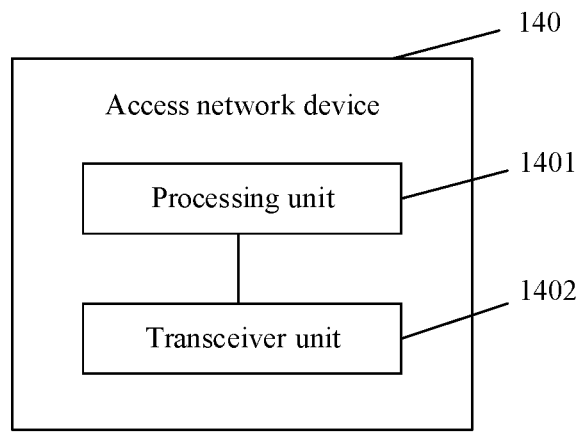
FIG. 14 is a schematic structural diagram of an access network device according to an embodiment of this application.

In a case that each functional module is divided correspondingly to each function, FIG. 14 is a schematic diagram of possible compositions of an access network device 140 involved in the foregoing embodiments. As shown in FIG. 14, the access network device 140 may include a processing unit (e.g., processing circuit) 1401 and a transceiver unit (e.g., transceiver circuit) 1402. The processing unit 1401 may include the foregoing BBU, and the transceiver unit 1402 may include the foregoing RRU and antenna, or include the AAU.

The processing unit 1401 may be configured to support the access network device 140 in performing step 101, step 121, step 123, step 125, step 126, and the like, and/or another process of the technology described in this specification.

The transceiver unit 1402 may be configured to support the access network device 140 in performing step 102, step 122, step 124, and the like, and/or another process of the technology described in this specification.

It should be noted that, all related content of steps involved in the foregoing method embodiments may be cited in function descriptions of corresponding functional modules. Details are not described herein again.

The access network device 140 provided in some embodiments are configured to perform the foregoing resource configuration method, and therefore can achieve a same effect as the foregoing implementation method.

When an integrated unit (e.g., integrated circuit) is used, the access network device 140 may include a processing module and a communication module. The processing module may be configured to control and manage an action of the access network device 140, for example, may be configured to support the access network device 140 in performing the steps performed by the processing unit 1401. The communication module may be configured to support the access network device 140 in communicating with another device, for example, communicating with a terminal device.

The processing module may be a processor or a controller. The processing module may implement or execute logical blocks, modules, and circuits in various examples described with reference to content disclosed in this application. The processor may alternatively be a combination for implementing a computing function, for example, a combination of one or more microprocessors or a combination of a digital signal processor (DSP) and a microprocessor. The access network device may further include a memory, configured to store a program and/or an instruction of the access network device. The memory may further store data. The communication module may be a transceiver, for example, a device that interacts with another electronic device, such as a radio frequency circuit, a Bluetooth chip, or a Wi-Fi chip.

Figure 15:
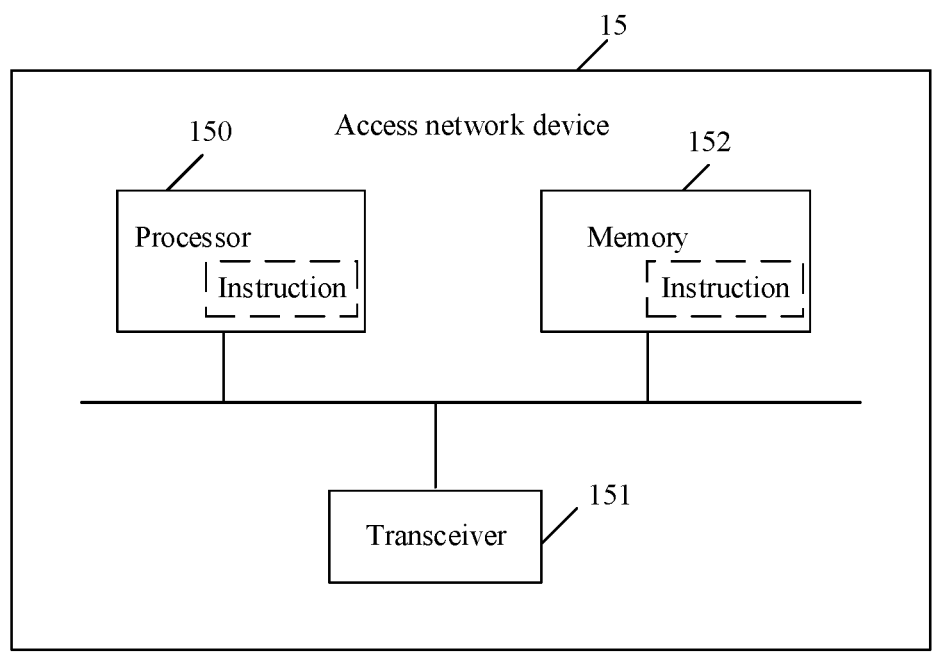
FIG. 15 is a schematic structural diagram of an access network device according to an embodiment of this application.

In an embodiment, when the processing module is a processor and includes a memory, the access network device 140 involved in some embodiments may be an access network device 15 having a structure shown in FIG. 15, including a processor 150, a transceiver 151, and a memory 152.

The access network device 15 may include one or more processors 150. The processor 150 may be a general-purpose processor or a dedicated processor. For example, the processor may be a baseband processor or a central processing unit. The baseband processor may be configured to process a communication protocol and communication data. The central processing unit may be configured to: control a base station or a chip, execute a software program, and process data of the software program. Optionally, the processor 150 may also store instructions and/or data.

An embodiment of this application further provides a communication system. The communication system includes the foregoing access network device and the foregoing terminal device.

An embodiment of this application further provides a computer-readable medium, configured to store computer program code. The computer program includes an instruction used for performing the method performed by the access network device in the foregoing communication methods. The readable medium may be a read-only memory (ROM) or a random access memory (RAM). This is not limited in the embodiments of this application.

This application further provides a computer program product. The computer program product includes an instruction. When the instruction is executed, an access network device is enabled to perform an operation corresponding to the access network device in the foregoing method.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute a computer instruction, so that a communication apparatus to which the chip is applied performs an operation of the access network device in the foregoing method provided in the embodiments of this application.

Based on the descriptions of the foregoing implementations, a person skilled in the art may understand that, for the purpose of convenient and brief description, division of the foregoing functional modules is merely used as an example for illustration. During actual application, the foregoing functions may be allocated to and completed by different functional modules according to a requirement. In other words, an inner structure of an apparatus is divided into different functional modules to complete all or some of the functions described above.

In the several embodiments provided in this application, it should be understood that the disclosed apparatuses and methods may be implemented in other manners. For example, the described apparatus embodiments are merely examples. For example, the module or unit division is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a universal serial bus (USB) flash drive, a removable hard disk, a ROM, a RAM, a magnetic disk, or an optical disc.

The foregoing content is merely some implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource configuration method, comprising:
obtaining, by an access network device, first configuration information, wherein the first configuration information comprises a bandwidth range of a new radio (NR) cell, and the bandwidth range of the NR cell comprises a dedicated frequency domain resource of the NR cell and a frequency domain resource shared by the NR cell and a long term evolution (LTE) cell;
sending, by the access network device, the first configuration information to a terminal device in the NR cell;
obtaining, by the access network device, second configuration information, wherein the second configuration information comprises a bandwidth range of the LTE cell; and
sending, by the access network device, the second configuration information to a second terminal device in the LTE cell, wherein the first configuration information and the second configuration information are sent in separate messages.

2. The method according to claim 1, wherein the bandwidth range of the LTE cell comprises the frequency domain resource shared by the LTE cell and the NR cell.

3. The method according to claim 2, wherein the first configuration information is carried in a first system message, and the second configuration information is carried in a second system message.

4. The method according to claim 1, wherein the method further comprises:
allocating, by the access network device, a frequency domain resource to a first signal in the NR cell, wherein the frequency domain resource of the first signal is on the dedicated frequency domain resource; and
the first signal comprises at least one of the following signals:
a signal used by the terminal device to synchronize with the access network device, a signal used by the terminal device to perform a timing function with the access network device, a signal used by the terminal device to obtain cell channel state information, a signal used by the terminal device to determine a cell to be camped on, or a signal used by the terminal device to access the access network device.

5. The method according to claim 4, wherein the signal used by the terminal device to synchronize with the access network device comprises a synchronization signal and physical broadcast channel block (SSB);
the signal used by the terminal device to perform the timing function with the access network device comprises a tracking reference signal (TRS);
the signal used by the terminal device to obtain the cell channel state information comprises a channel state information-reference signal (CSI-RS) and a demodulation reference signal (DMRS);
the signal used by the terminal device to determine the cell to be camped on comprises a common physical downlink control channel (PDCCH); and
the signal used by the terminal device to access the access network device comprises a physical random access channel (PRACH).

6. The method according to claim 1, wherein the method further comprises:
allocating, by the access network device, a frequency domain resource of a PDCCH to the NR cell, wherein the frequency domain resource of the PDCCH is on the dedicated frequency domain resource, the frequency domain resource of the PDCCH is on the shared frequency domain resource, or a first part of the frequency domain resource of the PDCCH is on the dedicated frequency domain resource and a second part is on the shared frequency domain resource.

7. The method according to of claim 1, wherein the method further comprises:
when the access network device allocates a frequency domain resource to a second signal in the NR cell, preferentially allocating, by the access network device, the dedicated frequency domain resource to the second signal.

8. The method according to claim 7, wherein the second signal comprises any one of the following signals:
a PDCCH, a physical downlink shared channel (PDSCH), a physical uplink control channel (PUCCH), or a physical uplink shared channel (PUSCH).

9. The method according to claim 1, wherein the method further comprises:
when the access network device determines that the shared frequency domain resource is to be allocated to a PDCCH or a PDSCH of the NR cell, sending, by the access network device, a rate matching template to the terminal device in the NR cell, wherein the rate matching template indicates the terminal device not to receive, when receiving the PDCCH or the PDSCH, data on a resource indicated by the rate matching template.

10. A communication apparatus, comprising:
a processing circuit, configured to;
obtain first configuration information, wherein the first configuration information comprises a bandwidth range of a new radio (NR) cell, and the bandwidth range of the NR cell comprises a dedicated frequency domain resource of the NR cell and a frequency domain resource shared by the NR cell and a long term evolution (LTE) cell, and
obtain second configuration information, wherein the second configuration information comprises a bandwidth range of the LTE cell; and
a transceiver circuit, configured to send the first configuration information to a terminal device in the NR cell and the second configuration information to a second terminal device in the LTE cell, wherein the first configuration information and the second configuration information are sent in separate messages.

11. The communication apparatus according to claim 10, wherein the bandwidth range of the LTE cell comprises the frequency domain resource shared by the LTE cell and the NR cell.

12. The communication apparatus according to claim 11, wherein the first configuration information is carried in a first system message, and the second configuration information is carried in a second system message.

13. The communication apparatus according to claim 10, wherein the processing circuit is further configured to:
allocate a frequency domain resource to a first signal in the NR cell, wherein the frequency domain resource of the first signal is on the dedicated frequency domain resource; and
the first signal comprises at least one of the following signals:
a signal used by the terminal device to synchronize with the access network device, a signal used by the terminal device to perform a timing function with the access network device, a signal used by the terminal device to obtain cell channel state information, a signal used by the terminal device to determine a cell to be camped on, or a signal used by the terminal device to access the access network device.

14. The communication apparatus according to claim 13, wherein the signal used by the terminal device to synchronize with the access network device comprises a synchronization signal and physical broadcast channel block (SSB);
the signal used by the terminal device to perform the timing function with the access network device comprises a tracking reference signal (TRS);
the signal used by the terminal device to obtain the cell channel state information comprises a channel state information-reference signal (CSI-RS) and a demodulation reference signal (DMRS);
the signal used by the terminal device to determine the cell to be camped on comprises a common physical downlink control channel (PDCCH); and
the signal used by the terminal device to access the access network device comprises a physical random access channel (PRACH).

15. The communication apparatus according to claim 10, wherein the processing circuit is further configured to:
allocate a frequency domain resource of a PDCCH to the NR cell, wherein the frequency domain resource of the PDCCH is on the dedicated frequency domain resource, the frequency domain resource of the PDCCH is on the shared frequency domain resource, or a first part of the frequency domain resource of the PDCCH is on the dedicated frequency domain resource and a second part is on the shared frequency domain resource.

16. The communication apparatus according to claim 10, wherein the processing circuit is further configured to:
when allocating a frequency domain resource to a second signal in the NR cell, preferentially allocate the dedicated frequency domain resource to the second signal.

17. The communication apparatus according to claim 16, wherein the second signal comprises any one of the following signals:
a physical downlink control channel (PDCCH), a physical downlink shared channel (PDSCH), a physical uplink control channel (PUCCH), or a physical uplink shared channel (PUSCH).

18. The communication apparatus according to claim 10, wherein the transceiver circuit is further configured to:
when it is determined that the shared frequency domain resource is to be allocated to a PDCCH or a PDSCH of the NR cell, send a rate matching template to the terminal device in the NR cell, wherein the rate matching template indicates the terminal device not to receive, when receiving the PDCCH or the PDSCH, data on a resource indicated by the rate matching template.

19. A non-transitory computer-readable storage medium, comprising computer instructions, wherein when the computer instructions are run on an electronic device, the electronic device is enabled to:
obtain first configuration information, wherein the first configuration information comprises a bandwidth range of a new radio (NR) cell, and the bandwidth range of the NR cell comprises a dedicated frequency domain resource of the NR cell and a frequency domain resource shared by the NR cell and a long term evolution (LTE) cell;
send the first configuration information to a terminal device in the NR cell;
obtain second configuration information, wherein the second configuration information comprises a bandwidth range of the LTE cell; and
send the second configuration information to a second terminal device in the LTE cell, wherein the first configuration information and the second configuration information are sent in separate messages.

20. The non-transitory computer-readable storage medium according to claim 19, wherein the bandwidth range of the LTE cell comprises the frequency domain resource shared by the LTE cell and the NR cell.

* * * * *